US00RE50632E

(19) United States
(12) Reissued Patent
Sinha et al.

(10) Patent Number: US RE50,632 E
(45) Date of Reissued Patent: Oct. 14, 2025

(54) BUILDING ENERGY OPTIMIZATION SYSTEM WITH BATTERY POWERED VEHICLE COST OPTIMIZATION

(71) Applicant: Tyco Fire & Security GmbH, Neuhausen am Rheinfall (CH)

(72) Inventors: Sudhi R. Sinha, Milwaukee, WI (US); Youngchoon Park, Brookfield, WI (US); Robert D. Turney, Watertown, WI (US)

(73) Assignee: TYCO FIRE & SECURITY GMBH, Neuhausen am Rheinfall (CH)

(21) Appl. No.: 18/201,121

(22) Filed: May 23, 2023

Related U.S. Patent Documents

Reissue of:
(64) Patent No.: 11,014,466
Issued: May 25, 2021
Appl. No.: 16/246,342
Filed: Jan. 11, 2019

U.S. Applications:
(60) Provisional application No. 62/617,011, filed on Jan. 12, 2018.

(51) Int. Cl.
*B60L 53/64* (2019.01)
*B60L 53/62* (2019.01)
(Continued)

(52) U.S. Cl.
CPC ..... *B60L 53/64* (2019.02); *B60L 53/62* (2019.02); *B60L 53/63* (2019.02); *B60L 53/665* (2019.02);
(Continued)

(58) Field of Classification Search
CPC ..... G06Q 50/06; B60L 53/63
See application file for complete search history.

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

CN 101415011 A 4/2009
CN 102136099 A 7/2011
(Continued)

OTHER PUBLICATIONS

Balaji et al., "Brick: Metadata schema for portable smart building applications," Applied Energy, 2018 (20 pages).
(Continued)

*Primary Examiner* — Deandra M Hughes
(74) *Attorney, Agent, or Firm* — Foley & Lardner LLP

(57) ABSTRACT

A building optimization system includes charging and discharging a battery of a battery power vehicle. The building optimization system includes a charging system configured to cause the battery of the battery powered vehicle to charge or discharge. The building optimization system also includes an optimization controller including a processing circuit. The processing circuit is configured to receive charging constraints for the battery powered vehicle, determine whether to charge discharge the battery of the battery powered vehicle based on the charging constraints, and cause the charging system to charge or discharge the battery of the battery powered vehicle based on the optimization.

40 Claims, 17 Drawing Sheets

(51) Int. Cl.

| | |
|---|---|
| ***B60L 53/63*** | (2019.01) |
| ***B60L 53/66*** | (2019.01) |
| ***B60L 55/00*** | (2019.01) |
| ***B60L 58/13*** | (2019.01) |
| ***G06Q 10/04*** | (2023.01) |
| ***G06Q 10/06*** | (2023.01) |
| ***G06Q 30/02*** | (2023.01) |
| ***G06Q 30/0283*** | (2023.01) |
| ***G06Q 50/06*** | (2012.01) |
| ***H02J 3/24*** | (2006.01) |
| ***H02J 3/32*** | (2006.01) |

(52) U.S. Cl.

CPC ..... *B60L 55/00* (2019.02); *B60L 58/13* (2019.02); *G06Q 10/04* (2013.01); *G06Q 10/06* (2013.01); *G06Q 30/02* (2013.01); *G06Q 30/0283* (2013.01); *G06Q 50/06* (2013.01); *H02J 3/241* (2020.01); *H02J 3/322* (2020.01); *B60L 2250/16* (2013.01)

(56) References Cited

U.S. PATENT DOCUMENTS 5,581,478 A 12/1996 Cruse et al.
5,812,962 A 9/1998 Kovac
5,960,381 A 9/1999 Singers et al.
5,973,662 A 10/1999 Singers et al.
6,014,612 A 1/2000 Larson et al.
6,031,547 A 2/2000 Kennedy
6,134,511 A 10/2000 Subbarao
6,157,943 A 12/2000 Meyer
6,285,966 B1 9/2001 Brown et al.
6,363,422 B1 3/2002 Hunter et al.
6,385,510 B1 5/2002 Hoog et al.
6,389,331 B1 5/2002 Jensen et al.
6,401,027 B1 6/2002 Xu et al.
6,437,691 B1 8/2002 Sandelman et al.
6,477,518 B1 11/2002 Li et al.
6,487,457 B1 11/2002 Hull et al.
6,493,755 B1 12/2002 Hansen et al.
6,577,323 B1 6/2003 Jamieson et al.
6,626,366 B2 9/2003 Kayahara et al.
6,646,660 B1 11/2003 Patty
6,704,016 B1 3/2004 Oliver et al.
6,732,540 B2 5/2004 Sugihara et al.
6,764,019 B1 7/2004 Kayahara et al.
6,782,385 B2 8/2004 Natsumeda et al.
6,813,532 B2 11/2004 Eryurek et al.
6,816,811 B2 11/2004 Seem
6,823,680 B2 11/2004 Jayanth
6,826,454 B2 11/2004 Sulfstede
6,865,511 B2 3/2005 Frerichs et al.
6,925,338 B2 8/2005 Eryurek et al.
6,986,138 B1 1/2006 Sakaguchi et al.
7,031,880 B1 4/2006 Seem et al.
7,401,057 B2 7/2008 Eder
7,552,467 B2 6/2009 Lindsay
7,627,544 B2 12/2009 Chkodrov et al.
7,818,249 B2 10/2010 Lovejoy et al.
7,889,051 B1 2/2011 Billig et al.
7,996,488 B1 8/2011 Casabella et al.
8,078,330 B2 12/2011 Brickfield et al.
8,104,044 B1 1/2012 Scofield et al.
8,229,470 B1 7/2012 Ranjan et al.
8,401,991 B2 3/2013 Wu et al.
8,495,745 B1 7/2013 Schrecker et al.
8,516,016 B2 8/2013 Park et al.
8,532,808 B2 9/2013 Drees et al.
8,532,839 B2 9/2013 Drees et al.
8,600,556 B2 12/2013 Nesler et al.
8,635,182 B2 1/2014 Mackay
8,682,921 B2 3/2014 Park et al.
8,731,724 B2 5/2014 Drees et al.
8,737,334 B2 5/2014 Ahn et al.
8,738,334 B2 5/2014 Jiang et al.
8,751,487 B2 6/2014 Byrne et al.
8,788,097 B2 7/2014 Drees et al.
8,805,995 B1 8/2014 Oliver
8,843,238 B2 * 9/2014 Wenzel ..... G06Q 30/0206 236/44 C
8,874,071 B2 10/2014 Sherman et al.
8,941,465 B2 1/2015 Pineau et al.
8,990,127 B2 3/2015 Taylor
9,070,113 B2 6/2015 Shafiee et al.
9,116,978 B2 8/2015 Park et al.
9,185,095 B1 11/2015 Moritz et al.
9,189,527 B2 11/2015 Park et al.
9,196,009 B2 11/2015 Drees et al.
9,229,966 B2 1/2016 Aymeloglu et al.
9,286,582 B2 3/2016 Drees et al.
9,311,807 B2 4/2016 Schultz et al.
9,324,204 B2 * 4/2016 Naghi ..... G07C 9/33
9,344,751 B1 5/2016 Ream et al.
9,354,968 B2 5/2016 Wenzel et al.
9,507,686 B2 11/2016 Horn et al.
9,524,594 B2 12/2016 Ouyang et al.
9,558,196 B2 1/2017 Johnston et al.
9,652,813 B2 5/2017 Gifford et al.
9,701,203 B2 * 7/2017 Korenaga ..... G01S 19/13
9,753,455 B2 9/2017 Drees
9,811,249 B2 11/2017 Chen et al.
9,838,844 B2 12/2017 Emeis et al.
9,886,478 B2 2/2018 Mukherjee
9,948,359 B2 4/2018 Horton
10,055,114 B2 8/2018 Shah et al.
10,055,206 B2 8/2018 Park et al.
10,116,461 B2 10/2018 Fairweather et al.
10,169,454 B2 1/2019 Ait-Mokhtar et al.
10,171,586 B2 1/2019 Shaashua et al.
10,187,258 B2 1/2019 Nagesh et al.
10,486,540 B2 * 11/2019 Tsuchiya ..... B60L 58/12
10,514,963 B2 12/2019 Shrivastava et al.
10,515,098 B2 12/2019 Park et al.
10,534,326 B2 1/2020 Sridharan et al.
10,536,295 B2 1/2020 Fairweather et al.
10,554,052 B2 * 2/2020 Bell ..... H02J 50/10
10,571,947 B2 * 2/2020 Burlinson ..... G05B 19/042
10,650,444 B2 * 5/2020 Takatsuka ..... H01M 10/425
10,678,302 B1 * 6/2020 Shipman, Jr. ..... G06F 8/65
10,705,492 B2 7/2020 Harvey
10,708,078 B2 7/2020 Harvey
10,828,996 B2 * 11/2020 Korenaga ..... B60L 53/665
10,845,771 B2 11/2020 Harvey
10,854,194 B2 12/2020 Park et al.
10,862,928 B1 12/2020 Badawy et al.
10,873,099 B1 * 12/2020 Gurunathan ..... H01M 8/04604
10,903,677 B2 * 1/2021 Baysinger ..... H02J 50/80
10,921,760 B2 2/2021 Harvey
10,921,972 B2 2/2021 Park et al.
10,926,659 B2 * 2/2021 Lee ..... B60L 53/51
10,969,133 B2 4/2021 Harvey
10,986,121 B2 4/2021 Stockdale et al.
11,010,824 B2 * 5/2021 Takatsuka ..... B60L 50/60
11,014,466 B2 * 5/2021 Sinha ..... G06Q 50/06
11,016,998 B2 5/2021 Park et al.
11,024,292 B2 6/2021 Park et al.
11,038,709 B2 6/2021 Park et al.
11,070,390 B2 7/2021 Park et al.
11,073,976 B2 7/2021 Park et al.
11,108,587 B2 8/2021 Park et al.
11,113,295 B2 9/2021 Park et al.
11,126,932 B2 * 9/2021 Kyoung ..... G06Q 10/02
11,229,138 B1 1/2022 Harvey et al.
11,314,726 B2 4/2022 Park et al.
11,314,788 B2 4/2022 Park et al.
11,400,823 B1 * 8/2022 Sampath ..... B60L 58/12
12,100,280 B2 * 9/2024 Young ..... G08B 17/113
2002/0010562 A1 1/2002 Schleiss et al.
2002/0016639 A1 2/2002 Smith et al.
2002/0059229 A1 5/2002 Natsumeda et al.
2002/0123864 A1 9/2002 Eryurek et al.
2002/0147506 A1 10/2002 Eryurek et al.
2002/0177909 A1 11/2002 Fu et al.

(56) References Cited

U.S. PATENT DOCUMENTS

2003/0005486 A1 1/2003 Ridolfo et al.
2003/0014130 A1 1/2003 Grumelart
2003/0073432 A1 4/2003 Meade, II
2003/0158704 A1 8/2003 Triginai et al.
2003/0171851 A1 9/2003 Brickfield et al.
2003/0200059 A1 10/2003 Ignatowski et al.
2004/0068390 A1 4/2004 Saunders
2004/0128314 A1 7/2004 Katibah et al.
2004/0133314 A1 7/2004 Ehlers et al.
2004/0199360 A1 10/2004 Friman et al.
2005/0055308 A1 3/2005 Meyer et al.
2005/0108262 A1 5/2005 Fawcett et al.
2005/0154494 A1 7/2005 Ahmed
2005/0278703 A1 12/2005 Lo et al.
2005/0283337 A1 12/2005 Sayal
2006/0095521 A1 5/2006 Patinkin
2006/0140207 A1 6/2006 Eschbach et al.
2006/0184479 A1 8/2006 Levine
2006/0200476 A1 9/2006 Gottumukkala et al.
2006/0265751 A1 11/2006 Cosquer et al.
2006/0271589 A1 11/2006 Horowitz et al.
2007/0028179 A1 2/2007 Levin et al.
2007/0203693 A1 8/2007 Estes
2007/0261062 A1 11/2007 Bansal et al.
2007/0273497 A1 11/2007 Kuroda et al.
2007/0273610 A1 11/2007 Baillot
2008/0034425 A1 2/2008 Overcash et al.
2008/0039979 A1* 2/2008 Bridges ..... H02J 13/00002 700/292
2008/0039989 A1* 2/2008 Pollack ..... G06Q 50/06 701/22
2008/0094230 A1 4/2008 Mock et al.
2008/0097816 A1 4/2008 Freire et al.
2008/0186160 A1 8/2008 Kim et al.
2008/0249756 A1 10/2008 Chaisuparasmikul
2008/0252723 A1 10/2008 Park
2008/0281472 A1 11/2008 Podgorny et al.
2009/0195349 A1 8/2009 Frader-Thompson et al.
2010/0045439 A1 2/2010 Tak et al.
2010/0058248 A1 3/2010 Park
2010/0131533 A1 5/2010 Ortiz
2010/0274366 A1 10/2010 Fata et al.
2010/0281387 A1 11/2010 Holland et al.
2010/0286937 A1 11/2010 Hedley et al.
2010/0324962 A1 12/2010 Nesler et al.
2011/0015802 A1 1/2011 Imes
2011/0047418 A1 2/2011 Drees et al.
2011/0061015 A1 3/2011 Drees et al.
2011/0071685 A1 3/2011 Huneycutt et al.
2011/0077950 A1 3/2011 Hughston
2011/0087650 A1 4/2011 Mackay et al.
2011/0087988 A1 4/2011 Ray et al.
2011/0088000 A1 4/2011 Mackay
2011/0125737 A1 5/2011 Pothering et al.
2011/0137853 A1 6/2011 Mackay
2011/0153603 A1 6/2011 Adiba et al.
2011/0154363 A1 6/2011 Karmarkar
2011/0157357 A1 6/2011 Weisensale et al.
2011/0178977 A1 7/2011 Drees
2011/0191343 A1 8/2011 Heaton et al.
2011/0202192 A1 8/2011 Kempton
2011/0205022 A1 8/2011 Cavallaro et al.
2011/0218777 A1 9/2011 Chen et al.
2012/0011126 A1 1/2012 Park et al.
2012/0011141 A1 1/2012 Park et al.
2012/0022698 A1 1/2012 Mackay
2012/0062577 A1 3/2012 Nixon
2012/0064923 A1 3/2012 Imes et al.
2012/0083930 A1 4/2012 Ilic et al.
2012/0100825 A1 4/2012 Sherman et al.
2012/0101637 A1 4/2012 Imes et al.
2012/0135759 A1 5/2012 Imes et al.
2012/0136485 A1 5/2012 Weber et al.
2012/0158633 A1 6/2012 Eder
2012/0245750 A1 9/2012 Paul et al. ..... H02J 3/003 700/291
2012/0259583 A1 10/2012 Noboa et al.
2012/0272228 A1 10/2012 Marndi et al.
2012/0278051 A1 11/2012 Jiang et al.
2013/0007063 A1 1/2013 Kalra et al.
2013/0038430 A1 2/2013 Blower et al.
2013/0038707 A1 2/2013 Cunningham et al.
2013/0060820 A1 3/2013 Bulusu et al.
2013/0086497 A1 4/2013 Ambuhl et al.
2013/0097706 A1 4/2013 Titonis et al.
2013/0103221 A1 4/2013 Raman et al.
2013/0167035 A1 6/2013 Imes et al.
2013/0170710 A1 7/2013 Kuoch et al.
2013/0204836 A1 8/2013 Choi et al.
2013/0246916 A1 9/2013 Reimann et al.
2013/0247205 A1 9/2013 Schrecker et al.
2013/0262035 A1 10/2013 Mills
2013/0275174 A1 10/2013 Bennett et al.
2013/0275908 A1 10/2013 Reichard
2013/0297050 A1 11/2013 Reichard et al.
2013/0298244 A1 11/2013 Kumar et al.
2013/0331995 A1 12/2013 Rosen
2014/0032506 A1 1/2014 Hoey et al.
2014/0059483 A1 2/2014 Mairs et al.
2014/0081652 A1 3/2014 Klindworth
2014/0135952 A1 5/2014 Maehara
2014/0152651 A1 6/2014 Chen et al.
2014/0172184 A1 6/2014 Schmidt et al.
2014/0189861 A1 7/2014 Gupta et al.
2014/0207282 A1 7/2014 Angle et al.
2014/0258052 A1 9/2014 Khuti et al.
2014/0269614 A1 9/2014 Maguire et al.
2014/0277765 A1 9/2014 Karimi et al.
2014/0278461 A1 9/2014 Artz
2014/0327555 A1 11/2014 Sager et al.
2015/0019174 A1 1/2015 Kiff et al.
2015/0042240 A1 2/2015 Aggarwal et al.
2015/0105917 A1 4/2015 Sasaki et al.
2015/0145468 A1 5/2015 Ma et al.
2015/0156031 A1 6/2015 Fadell et al.
2015/0168931 A1 6/2015 Jin
2015/0172300 A1 6/2015 Cochenour
2015/0178421 A1 6/2015 Borrelli et al.
2015/0185261 A1 7/2015 Frader-Thompson et al.
2015/0186777 A1 7/2015 Lecue et al.
2015/0202962 A1 7/2015 Habashima et al.
2015/0204563 A1 7/2015 Imes et al.
2015/0235267 A1 8/2015 Steube et al.
2015/0241895 A1 8/2015 Lu et al.
2015/0244730 A1 8/2015 Vu et al.
2015/0244732 A1 8/2015 Golshan et al.
2015/0261863 A1 9/2015 Dey et al.
2015/0263900 A1 9/2015 Polyakov et al.
2015/0268304 A1 9/2015 Yonetani ..... H02J 3/322 320/157
2015/0286969 A1 10/2015 Warner et al.
2015/0295796 A1 10/2015 Hsiao et al.
2015/0304193 A1 10/2015 Ishii et al.
2015/0312696 A1 10/2015 Ribbich et al.
2015/0316902 A1 11/2015 Wenzel et al.
2015/0316907 A1 11/2015 Elbsat et al.
2015/0316918 A1 11/2015 Schleiss et al.
2015/0324422 A1 11/2015 Elder
2015/0341212 A1 11/2015 Hsiao et al.
2015/0348417 A1 12/2015 Ignaczak et al.
2015/0379080 A1 12/2015 Jochimski
2016/0011753 A1 1/2016 McFarland et al.
2016/0033946 A1 2/2016 Zhu et al.
2016/0035246 A1 2/2016 Curtis
2016/0065601 A1 3/2016 Gong et al.
2016/0070736 A1 3/2016 Swan et al.
2016/0078229 A1 3/2016 Gong et al.
2016/0090839 A1 3/2016 Stolarczyk
2016/0119434 A1 4/2016 Dong et al.
2016/0127712 A1 5/2016 Alfredsson et al.
2016/0139752 A1 5/2016 Shim et al.
2016/0163186 A1 6/2016 Davidson et al.
2016/0170390 A1 6/2016 Xie et al.

(56) References Cited

U.S. PATENT DOCUMENTS

2016/0171862 A1 6/2016 Das et al.
2016/0173816 A1 6/2016 Huenerfauth et al.
2016/0179315 A1 6/2016 Sarao et al.
2016/0179342 A1 6/2016 Sarao et al.
2016/0179990 A1 6/2016 Sarao et al.
2016/0195856 A1 7/2016 Spero
2016/0212165 A1 7/2016 Singla et al.
2016/0239660 A1 8/2016 Azvine et al.
2016/0239756 A1 8/2016 Aggour et al.
2016/0313751 A1 10/2016 Risbeck et al.
2016/0313752 A1 10/2016 Przybylski
2016/0313902 A1 10/2016 Hill et al.
2016/0336765 A1* 11/2016 Trimboli ..... H02J 7/0021
2016/0336767 A1* 11/2016 Zane ..... H02J 7/0068
2016/0350364 A1 12/2016 Anicic et al.
2016/0357828 A1 12/2016 Tobin et al.
2016/0358432 A1 12/2016 Branscomb et al.
2016/0363336 A1 12/2016 Roth et al.
2016/0370258 A1 12/2016 Perez
2016/0377306 A1 12/2016 Drees et al.
2016/0378306 A1 12/2016 Kresl et al.
2016/0379326 A1 12/2016 Chan-Gove et al.
2017/0006135 A1 1/2017 Siebel
2017/0011318 A1 1/2017 Vigano et al.
2017/0017221 A1 1/2017 Lamparter et al.
2017/0039255 A1 2/2017 Raj et al.
2017/0052536 A1 2/2017 Warner et al.
2017/0053441 A1 2/2017 Nadumane et al.
2017/0063894 A1 3/2017 Muddu et al.
2017/0068409 A1 3/2017 Nair
2017/0070775 A1 3/2017 Taxier et al.
2017/0075984 A1 3/2017 Deshpande et al.
2017/0084168 A1 3/2017 Janchookiat
2017/0090437 A1 3/2017 Veeramani et al.
2017/0093700 A1 3/2017 Gilley et al.
2017/0098086 A1 4/2017 Hoernecke et al.
2017/0102162 A1 4/2017 Drees et al.
2017/0102433 A1 4/2017 Wenzel et al.
2017/0102434 A1 4/2017 Wenzel et al.
2017/0102675 A1 4/2017 Drees
2017/0103327 A1 4/2017 Penilla et al.
2017/0103403 A1 4/2017 Chu et al.
2017/0103483 A1 4/2017 Drees et al.
2017/0104332 A1 4/2017 Wenzel et al.
2017/0104336 A1 4/2017 Elbsat et al.
2017/0104337 A1 4/2017 Drees
2017/0104342 A1 4/2017 Elbsat et al.
2017/0104343 A1 4/2017 Elbsat et al.
2017/0104344 A1 4/2017 Wenzel et al.
2017/0104345 A1 4/2017 Wenzel et al.
2017/0104346 A1 4/2017 Wenzel et al.
2017/0104449 A1 4/2017 Drees
2017/0123389 A1 5/2017 Baez et al.
2017/0134415 A1 5/2017 Muddu et al.
2017/0177715 A1 6/2017 Chang et al.
2017/0180147 A1 6/2017 Brandman et al.
2017/0188216 A1 6/2017 Koskas et al.
2017/0212482 A1 7/2017 Boettcher et al.
2017/0212668 A1 7/2017 Shah et al.
2017/0220641 A1 8/2017 Chi et al.
2017/0230930 A1 8/2017 Frey
2017/0235817 A1 8/2017 Deodhar et al.
2017/0251182 A1 8/2017 Siminoff et al.
2017/0259683 A1 9/2017 Shimizu et al. ..... B60L 53/63
2017/0270124 A1 9/2017 Nagano et al.
2017/0277769 A1 9/2017 Pasupathy et al.
2017/0278003 A1 9/2017 Liu
2017/0294132 A1 10/2017 Colmenares
2017/0315522 A1 11/2017 Kwon et al.
2017/0315697 A1 11/2017 Jacobson et al.
2017/0322534 A1 11/2017 Sinha et al.
2017/0323389 A1 11/2017 Vavrasek
2017/0329289 A1 11/2017 Kohn et al.
2017/0336770 A1 11/2017 MacMillan
2017/0345287 A1 11/2017 Fuller et al.
2017/0351957 A1 12/2017 Lecue et al.
2017/0357225 A1 12/2017 Asp et al.
2017/0357490 A1 12/2017 Park et al.
2017/0357908 A1 12/2017 Cabadi et al.
2018/0012159 A1 1/2018 Kozloski et al.
2018/0013579 A1 1/2018 Fairweather et al.
2018/0024520 A1 1/2018 Sinha et al.
2018/0039238 A1 2/2018 Gartner et al.
2018/0048485 A1 2/2018 Pelton et al.
2018/0069932 A1 3/2018 Tiwari et al.
2018/0114140 A1 4/2018 Chen et al.
2018/0137288 A1 5/2018 Polyakov
2018/0143601 A1 5/2018 Chavan et al.
2018/0157930 A1 6/2018 Rutschman et al.
2018/0162400 A1 6/2018 Abdar
2018/0176241 A1 6/2018 Manadhata et al.
2018/0196456 A1 7/2018 Elbsat
2018/0197253 A1 7/2018 Elbsat et al.
2018/0198627 A1 7/2018 Mullins
2018/0203961 A1 7/2018 Aisu et al.
2018/0239982 A1 8/2018 Rutschman et al.
2018/0275625 A1 9/2018 Park et al.
2018/0276962 A1 9/2018 Butler et al.
2018/0292797 A1 10/2018 Lamparter et al.
2018/0336785 A1 11/2018 Ghannam et al.
2018/0359111 A1 12/2018 Harvey
2018/0364654 A1 12/2018 Locke et al.
2019/0005025 A1 1/2019 Malabarba
2019/0011926 A1* 1/2019 Konishi ..... G01C 21/3476
2019/0013023 A1 1/2019 Pourmohammad et al.
2019/0025771 A1 1/2019 Park et al.
2019/0037135 A1 1/2019 Hedge
2019/0039467 A1* 2/2019 Hortop ..... H02J 7/0071
2019/0042988 A1 2/2019 Brown et al.
2019/0088106 A1 3/2019 Grundstrom
2019/0094824 A1 3/2019 Xie et al.
2019/0096217 A1 3/2019 Pourmohammad et al.
2019/0102840 A1 4/2019 Perl et al.
2019/0138512 A1 5/2019 Pourmohammad et al.
2019/0147883 A1 5/2019 Mellenthin et al.
2019/0158309 A1 5/2019 Park et al.
2019/0163152 A1 5/2019 Worrall et al.
2019/0268178 A1 8/2019 Fairweather et al.
2019/0299802 A1* 10/2019 Neubecker ..... B60L 53/68
2019/0310979 A1 10/2019 Masuzaki et al.
2020/0015048 A1* 1/2020 Mendes ..... H04L 67/125
2020/0067341 A1* 2/2020 Glover ..... H02J 50/80
2020/0101850 A1* 4/2020 Harty ..... B60L 55/00
2020/0226156 A1 7/2020 Borra et al.
2020/0285203 A1 9/2020 Thakur et al.
2020/0303967 A1* 9/2020 Wong ..... H05K 7/20136
2021/0042299 A1 2/2021 Migliori
2021/0381711 A1 12/2021 Harvey et al.
2021/0381712 A1 12/2021 Harvey et al.
2021/0382445 A1 12/2021 Harvey et al.
2021/0383041 A1 12/2021 Harvey et al.
2021/0383042 A1 12/2021 Harvey et al.
2021/0383200 A1 12/2021 Harvey et al.
2021/0383219 A1 12/2021 Harvey et al.
2021/0383235 A1 12/2021 Harvey et al.
2021/0383236 A1 12/2021 Harvey et al.
2022/0066402 A1 3/2022 Harvey et al.
2022/0066405 A1 3/2022 Harvey
2022/0066432 A1 3/2022 Harvey et al.
2022/0066434 A1 3/2022 Harvey et al.
2022/0066528 A1 3/2022 Harvey et al.
2022/0066722 A1 3/2022 Harvey et al.
2022/0066754 A1 3/2022 Harvey et al.
2022/0066761 A1 3/2022 Harvey et al.
2022/0067226 A1 3/2022 Harvey et al.
2022/0067227 A1 3/2022 Harvey et al.
2022/0067230 A1 3/2022 Harvey et al.
2022/0069863 A1 3/2022 Harvey et al.
2022/0070293 A1 3/2022 Harvey et al.
2022/0138684 A1 5/2022 Harvey
2022/0215264 A1 7/2022 Harvey et al.
2023/0010757 A1 1/2023 Preciado

(56) References Cited

U.S. PATENT DOCUMENTS

| | | | | |
|---|---|---|---|---|
| 2024/0073055 | A1* | 2/2024 | Park | H04L 12/2832 |
| 2024/0261956 | A1* | 8/2024 | Obermann | B25F 5/02 |

FOREIGN PATENT DOCUMENTS

| | | | |
|---|---|---|---|
| CN | 102136100 | A | 7/2011 |
| CN | 102650876 | A | 8/2012 |
| CN | 104040583 | A | 9/2014 |
| CN | 104603832 | A | 5/2015 |
| CN | 104919484 | A | 9/2015 |
| CN | 106204392 | A | 12/2016 |
| CN | 106406806 | A | 2/2017 |
| CN | 106960269 | A | 7/2017 |
| CN | 107147639 | A1 | 9/2017 |
| CN | 107598928 | A | 1/2018 |
| EP | 2 528 033 | A1 | 11/2012 |
| EP | 2 966 611 | A1 | 1/2016 |
| EP | 3 324 306 | A1 | 5/2018 |
| JP | H10-049552 | A | 2/1998 |
| JP | 2003-162573 | A | 6/2003 |
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |

OTHER PUBLICATIONS

Balaji et al., "Brick: Metadata schema for portable smart building applications," Applied Energy, Sep. 15, 2018, 3 pages, (Abstract).

Balaji et al., "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Chinese Office Action on CN Appl. Ser. No. 201780003995.9 dated Apr. 8, 2021 (21 pages with English language translation).

Chinese Office action on CN Appl. Ser. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

Digital Platform Litigation Documents Part 10, includes DDE-1-21-cv-01796 (documents filed Nov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick," BuildSys '19, New York, NY, USA, Nov. 13-14, 2019 (10 pages).

Fierro et al., "Dataset: An Open Dataset and Collection Tool for BMS Point Labels," DATA'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).

File History for U.S. Appl. No. 12/776,159, filed May 7, 2010 (722 pages).

Final Conference Program, ACM BuildSys 2016, Stanford, CA, USA, Nov. 15-17, 2016 (7 pages).

(56) References Cited

OTHER PUBLICATIONS

Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for International Application No. PCT/US2019/013325, mailed Jun. 11, 2019, 17 pages.
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric CO., LTD., "Smart power supply system (SPSS)," Outline of the scale verification plan, Nissin Electric Technical Report, Japan, Apr. 23, 2014, vol. 59, No. 1 (23 pages with English language abstract).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

* cited by examiner

BUILDING ENERGY OPTIMIZATION SYSTEM WITH BATTERY POWERED VEHICLE COST OPTIMIZATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATIONS

[This application claims priority to and the benefit of U.S. provisional Patent Application No. 62/617,011, entitled "Building Energy Optimization System with Battery Powered Vehicle Cost Optimization," filed Jan. 12, 2018, which is incorporated herein by reference in its entirety.] *This application is an application for reissue of U.S. Pat. No. 11,014,466, which issued on May 25, 2021, from U.S. patent application Ser. No. 16/246,342 filed Jan. 11, 2019, which claims the benefit of and priority to U.S. Provisional Patent Application No. 62/617,011 filed Jan. 12, 2018, all of which are incorporated by reference herein in their entireties.*

BACKGROUND

The present disclosure relates generally to a building energy system. The present invention relates more particularly to systems and methods for optimizing an energy system within a building providing energy to battery powered devices. A building energy system, in general, is a system of devices configured to provide and consume the energy loads of a building or campus. A building energy system may include devices such as a central plant configured to serve different types of energy loads, a building management system (BMS) configured to control, monitor, and manage equipment in or around a building area, and external devices configured to connect to the building energy system and consume energy provided by the building energy system.

SUMMARY

One implementation of the present disclosure is a building optimization system for charging and discharging a battery of a battery power vehicle. The building optimization system includes a charging system configured to cause the battery of the battery powered vehicle to charge or discharge. The building optimization system also includes an optimization controller including a processing circuit. The processing circuit is configured to receive charging constraints for the battery powered vehicle, determine whether to charge discharge the battery of the battery powered vehicle based on the charging constraints, and cause the charging system to charge or discharge the battery of the battery powered vehicle based on the optimization.

In some embodiments, the charging constraints include a departure time and a particular charge level for the departure time. The processing circuit is configured to cause the charging system to charge or discharge the battery of the battery powered vehicle such that a battery charge level of the battery is at the particular charge level at the departure time.

In some embodiments, the charging constraints include a first charging program that charges and discharges the battery and charges the battery to a predefined amount at a departure time.

In some embodiments, the charging constraints include a second charging program that charges the battery a different charging rates and charges the battery to a predefine amount at a departure time. The second charging program does not allow for the battery to discharge.

In some embodiments, the processing circuit is configured to generate a predicted departure time by receiving schedule events of a schedule associated with a user from a mobile device associated with the user, storing the schedule in a server, and generating the predicted departure time based on the schedule events.

In some embodiments, the processing circuit is configured to generate a predicted departure time by communicating via a wireless network with a mobile device associated with a user, determine a location of the mobile device associated with the user based on the communication via the wireless network with the mobile device, log the location and other previous locations of the mobile device in a location log, and generate the predicted departure time based on a pattern of locations of the mobile device based on the locations of the location log.

In some embodiments, the processing circuit configured to generate a predicted departure time causes the optimization to determine to charge or discharge the battery of the battery powered vehicle so that a charge level of the battery is a predefined amount at the predicted departure time.

In some embodiments, the processing circuit is configured to determine whether to charge or discharge the battery of the battery powered vehicle by performing an optimization with the charging constraints by generating a cost function accounting for cost and revenue generated from purchasing energy from an energy grid to charge the battery of the battery powered vehicle and revenue generated from discharging the battery of the battery powered vehicle to power building equipment or provide power to an energy grid, optimize the cost function to determine whether to charge or discharge the batter at time steps of an optimization window, and cause the charging system to charge or discharge the battery of the battery powered vehicle based on the optimization by causing the charging system to charge or discharge the battery at time steps of the optimization window.

Another implementation of the present disclosure is a building optimization system for charging and discharging a battery of a battery power mobile device. The building optimization system includes a charging system configured to cause the battery of the battery powered mobile device to charge or discharge and optimization controller including a processing circuit. The processing circuit is configured to receive charging constraints for the battery powered mobile device, determine whether to charge or discharge the battery of the battery powered mobile device by performing an optimization with the charging constraints, and cause the charging system to charge or discharge the battery of the battery powered mobile device based on the optimization.

In some embodiments, the charging constraints include a departure time and a particular charge level for the departure time. The processing circuit is configured to cause the charging system to charge or discharge the battery of the battery powered mobile device such that a battery charge level of the battery of the battery powered mobile device is at the particular charge level at the departure time.

In some embodiments, the charging constraints include a first charging program that charges and discharges the battery and charges the battery to a predefine amount at a departure time.

In some embodiments, the charging constraints include a second charging program that charges the battery at different charging rates and charges the battery to a predefined amount at a departure time. The second charging program does not allow for the battery to discharge.

In some embodiments, the processing circuit is configured to determine whether to charge or discharge the battery of the battery powered mobile device by performing an optimization with the charging constraints by generating a cost function accounting for cost and revenue generated from purchasing energy from an energy grid to charge the battery of the battery powered mobile device and revenue generated from discharging the battery of the battery powered mobile device to power building equipment or provide power to an energy grid, optimize the cost function to determine whether to charge or discharge the batter at time steps of an optimization window, and cause the charging system to charge or discharge the battery of the battery powered mobile device based on the optimization by causing the charging system to charge or discharge the battery at time steps of the optimization window.

Another implementation of the present disclosure is a method for optimizing a building energy system. The method involves connecting a battery powered device to a charging system connected to a building electrical grid, receiving charging constraints for a battery powered device, performing an optimization with the charging constraints, determining whether to charge or discharge a battery of the battery powered device, and causing the charging system to charge or discharge the battery of the battery powered device based on the optimization.

In some embodiments, receiving charging constraints involves receiving a departure time and a particular charge level for the departure time.

In some embodiments, receiving charging constraints involves selecting a first charging program that includes charging and discharging the battery of the battery powered device and charging the battery of the battery powered device to a predefined amount at a departure time.

In some embodiments, receiving charging constraints involves selecting a second charging program that includes charge the battery of the battery powered device at different charging rates and charging the battery of the battery powered device to a predefine amount at a departure time. The second charging program does not include discharging the battery.

In some embodiments, determining whether to charge of discharge the battery of the battery powered device involves generating a predicted departure time by receiving schedule events of a schedule associated with a user from a mobile device associated with the user, a server configured to store the schedule associated with the user, and generating the predicted departure time based on the one or more schedule events.

In some embodiments, receiving charging constraints involves receiving a predicted departure time that involves determining whether to charge or discharge the battery of the battery powered device such that a charge level of the battery of the battery powered device is a predefined amount at the predicted departure time.

In some embodiments, performing an optimization involves generating a cost function accounting for cost and revenue generated from purchasing energy from an energy grid to charge the battery of the battery powered device and revenue generated from discharging the battery of the battery powered device to power building equipment or provide power to an energy grid, optimize the cost function to determine whether to charge or discharge the batter at time steps of an optimization window, and cause the charging system to charge or discharge the battery of the battery powered device based on the optimization by causing the charging system to charge or discharge the battery at time steps of the optimization window.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Frequency Response Optimization

Figure 1:
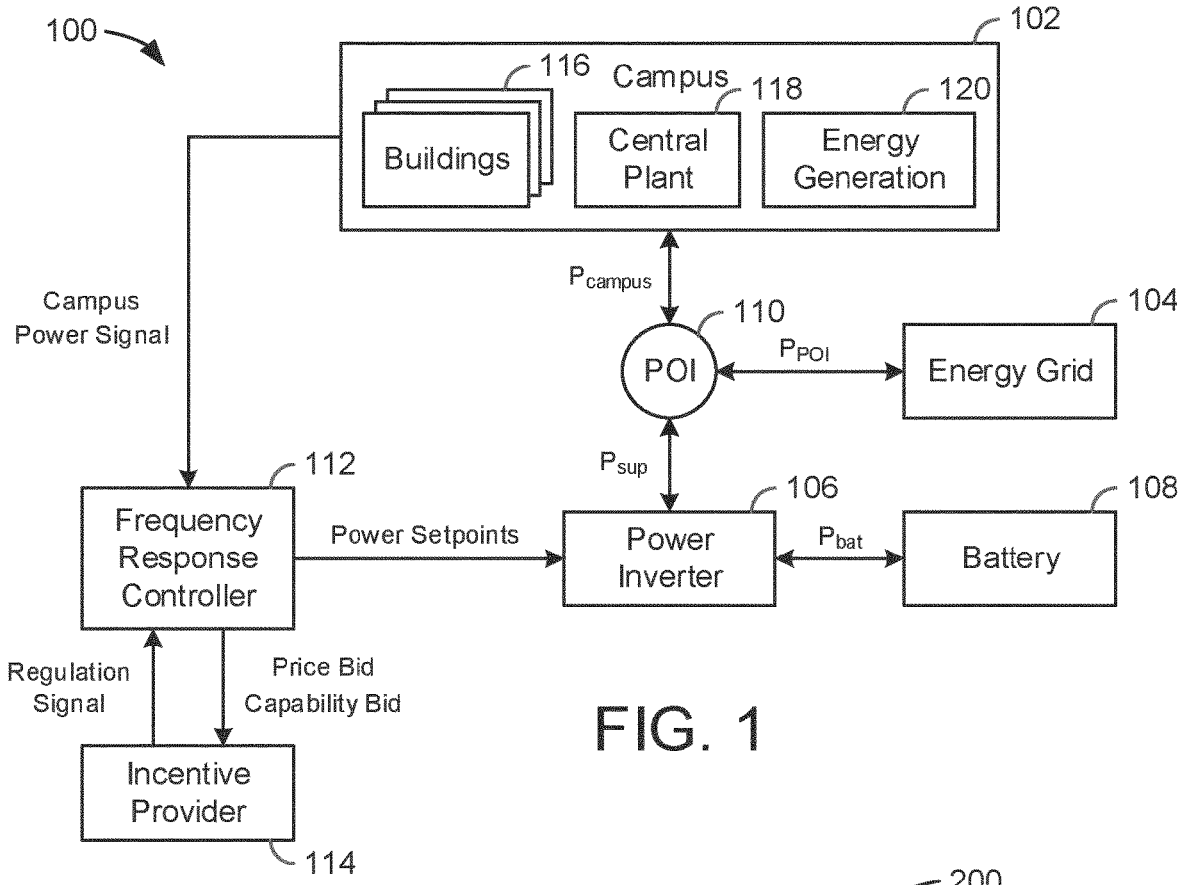
FIG. 1 is a block diagram of a frequency response optimization system, according to an exemplary embodiment.

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}$ $P_{loss}$, where $P_{bat}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
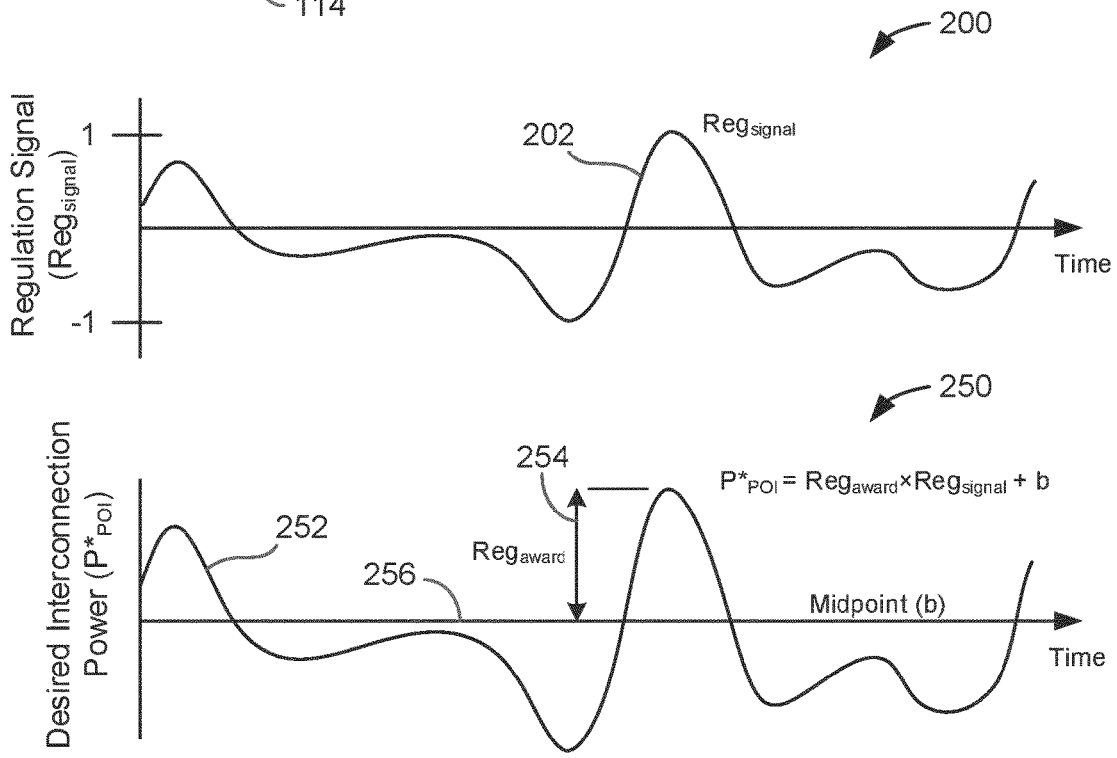
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}=0.5$) may indicate that system 100 is requested to add 5 MW of power at POI 110 relative to midpoint b (e.g., $P_{POI}^*=10\text{ MW}\times 0.5+b$), whereas a regulation signal value of −0.3 may indicate that system 100 is requested to remove 3 MW of power from POI 110 relative to midpoint b (e.g., $P_{POI}^*=10\text{ MW}\times -0.3+b$).

Graph 250 illustrates the desired interconnection power $P_{POI}^*$ 252 as a function of time. $P_{POI}^*$ 252 may be calculated by frequency response controller 112 based on $Reg_{signal}$ 202, $Reg_{award}$ 254, and a midpoint b 256. For example, controller 112 may calculate $P_{POI}^*$ 252 using the following equation:

$$P_{POI}^*=Reg_{award}\times Reg_{signal}+b$$

where $P_{POI}^*$ represents the desired power at POI 110 (e.g., $P_{POI}^*=P_{sup}+P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^*=Reg_{award}\times Reg_{signal}+b$$

where $P_{POI}^*=P_{sup}+P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P_{POI}^*=Reg_{award}\times Res_{FR}+b$$

where $Res_{FR}$ is an optimal frequency response generated by optimizing a value function. Controller 112 may subtract $P_{campus}$ from $P_{POI}^*$ to generate the power setpoint for power inverter 106 (i.e., $P_{sup}=P_{POI}^*-P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
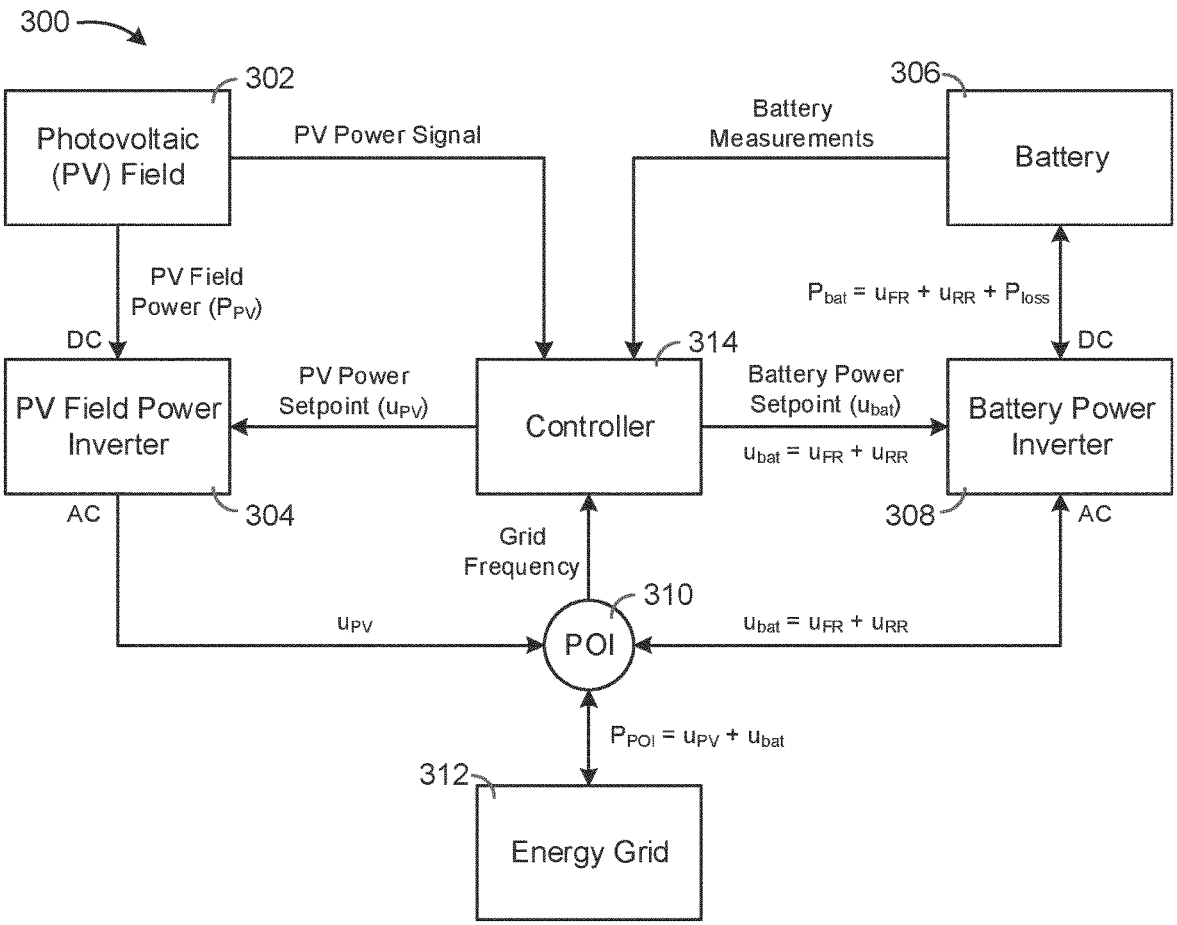
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
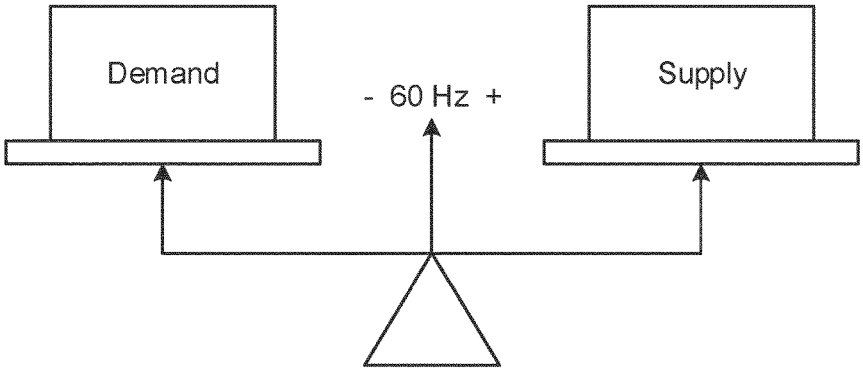
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}$ $u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
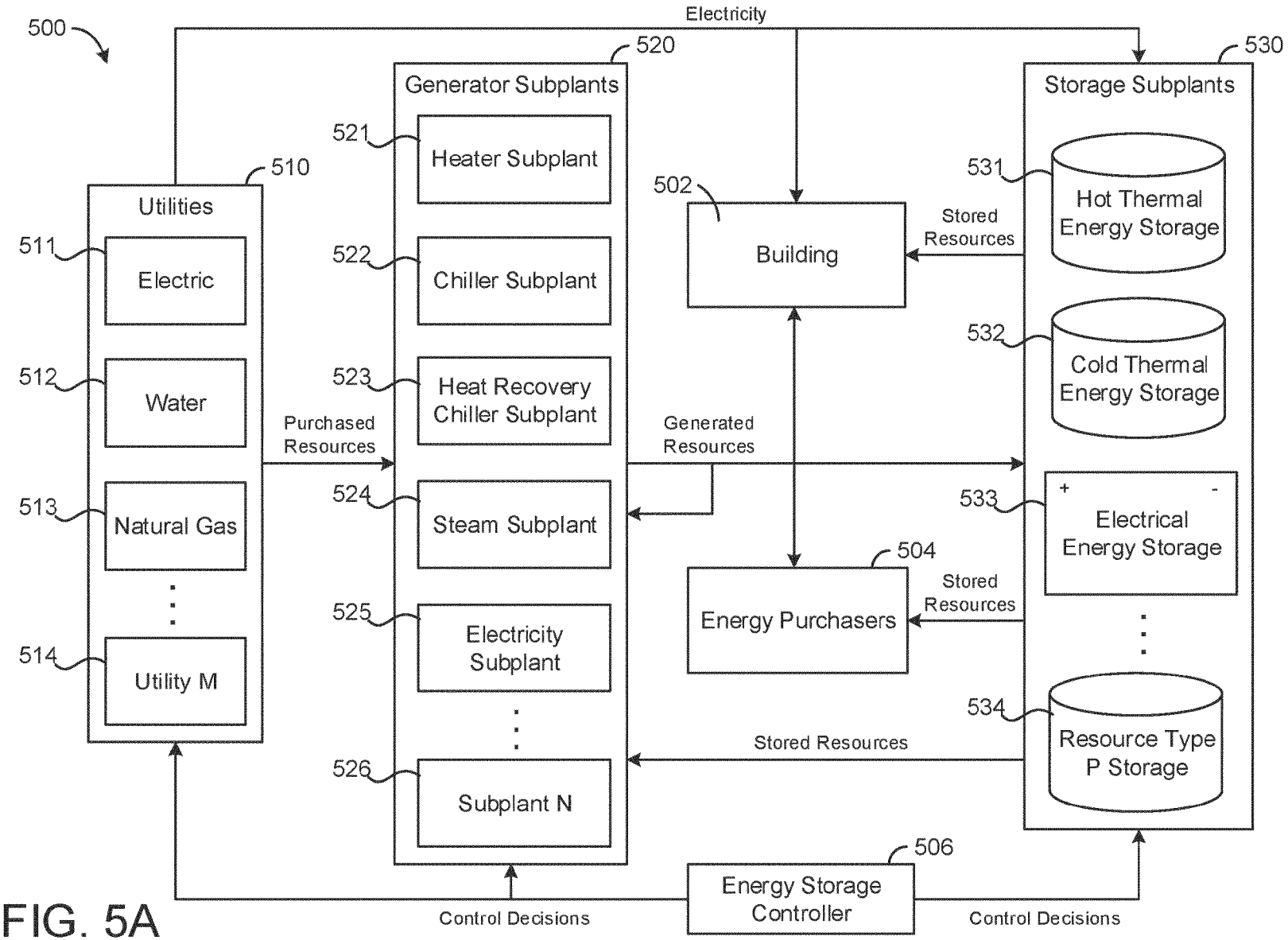
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
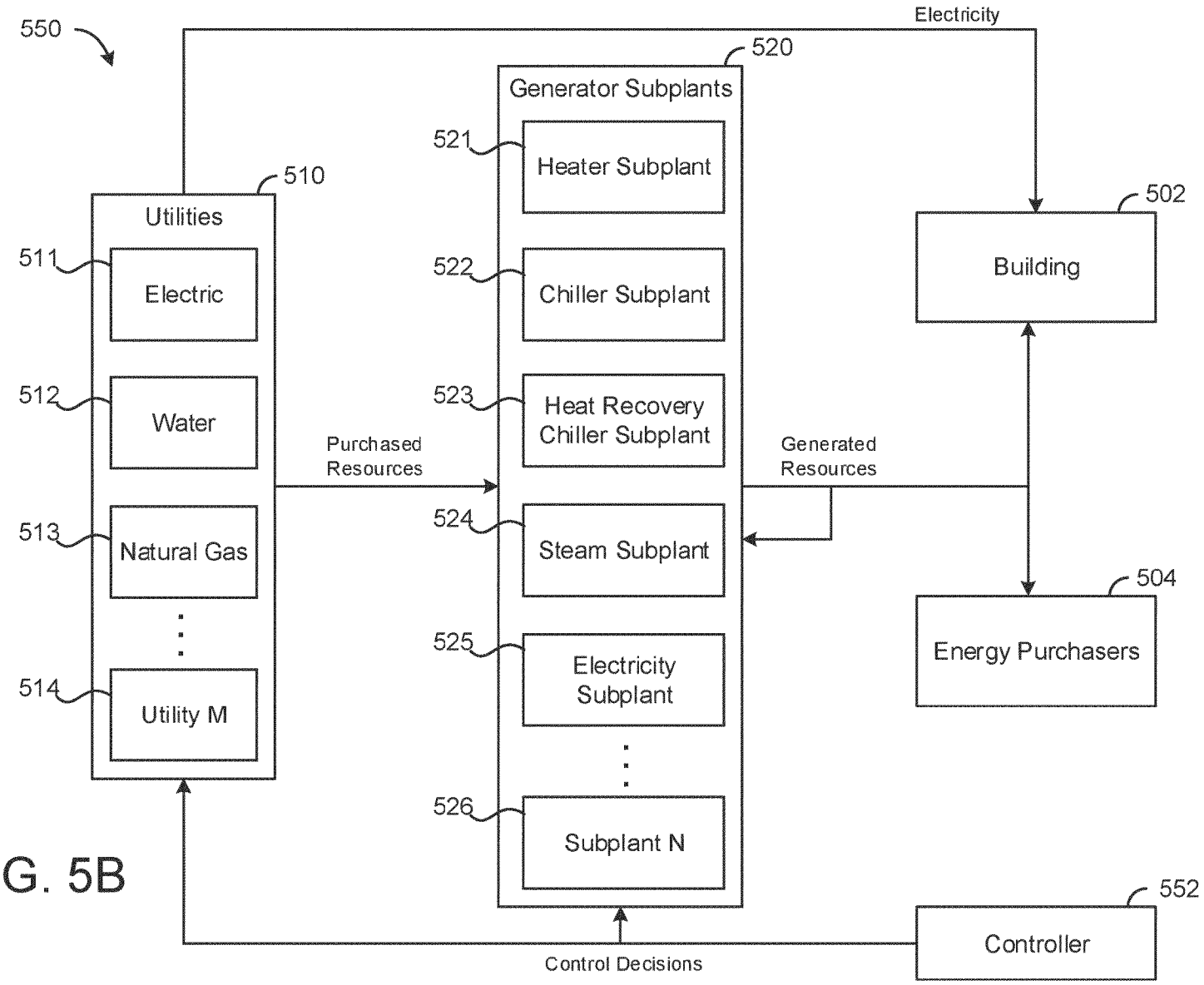
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG. 5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include a plurality of utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 506. Controller 506 may be configured to control the distribution, production, and usage of resources in system 550. In some embodiments, controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy cost optimization system 550 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 506 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 506.

In some embodiments, one or more of subplants 520 includes a subplant level controller configured to control the equipment of the corresponding subplant. For example, controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 506 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
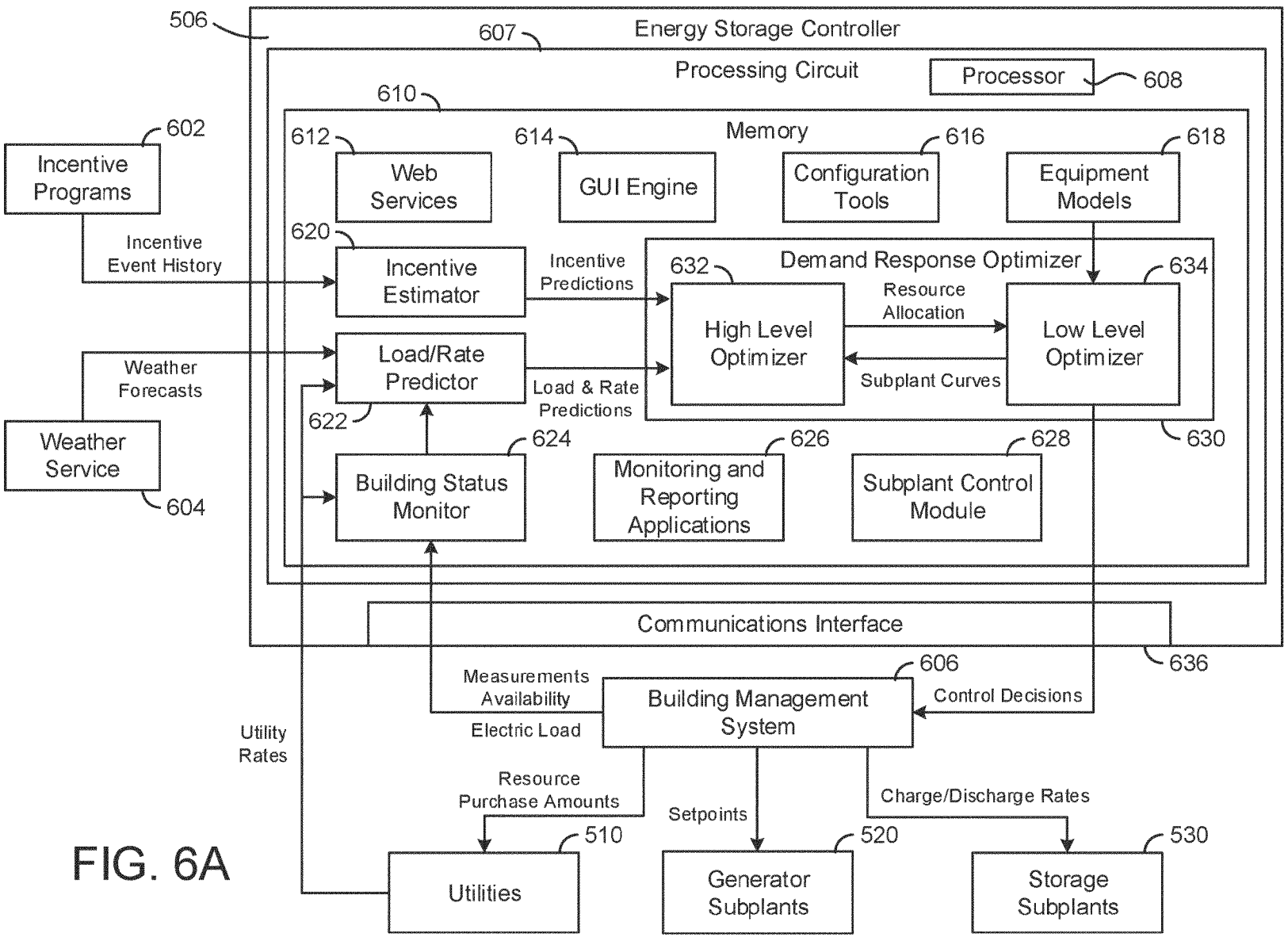
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510 setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may be integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (clay), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period.

Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6A, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
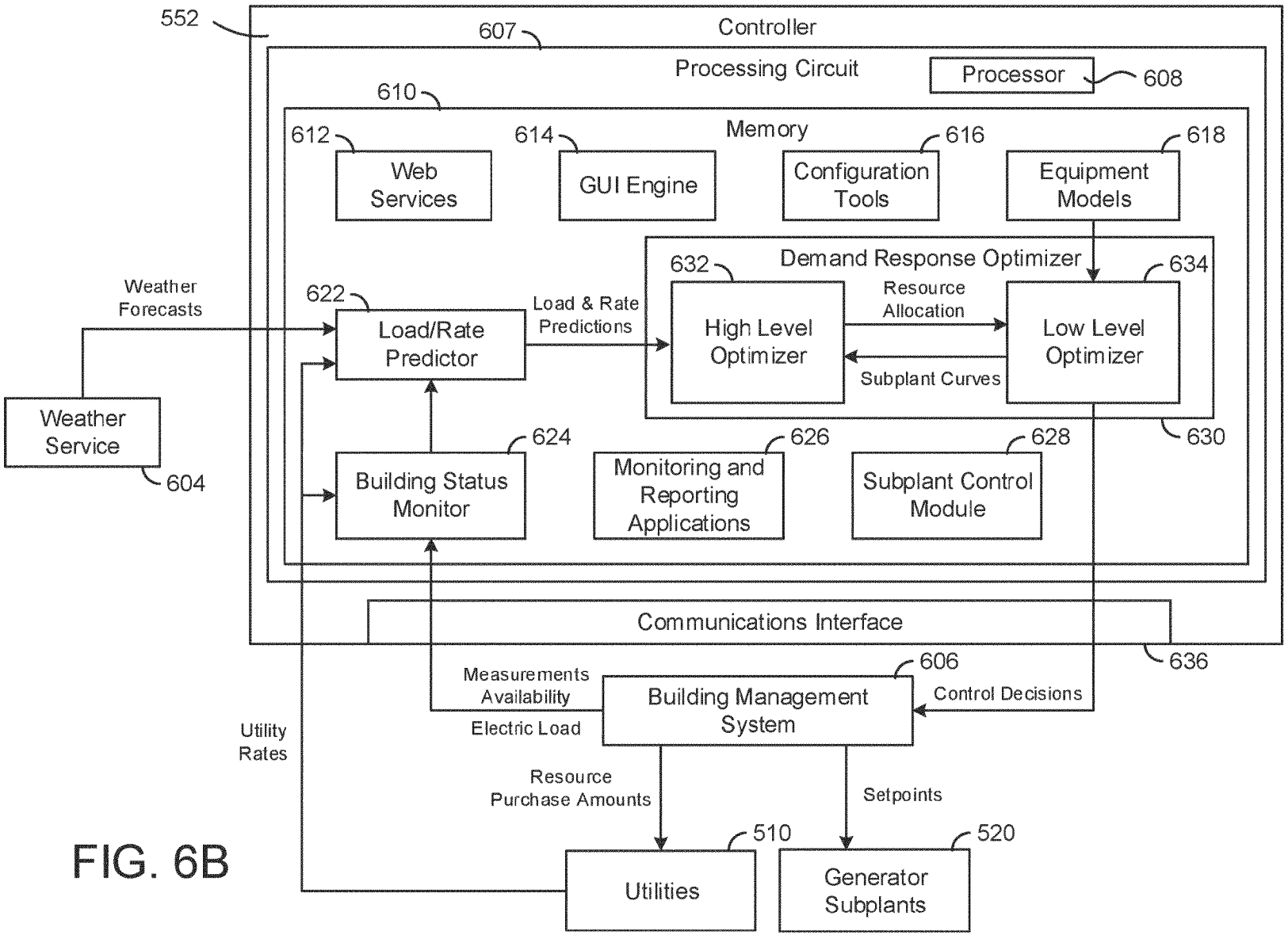
FIG. 6B is a block diagram of a controller which may be used to operate the energy cost optimization system of FIG. 5B, according to an exemplary embodiment.

Referring now to FIG. 6B, a block diagram illustrating controller 506 in greater detail is shown, according to an exemplary embodiment. Controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 506 specifying on/off states and/or setpoints for the subplant equipment. BMS 606 may control the equipment (e.g., via actuators, power relays, etc.) in accordance with the control signals provided by controller 506. For example, BMS 606 may operate the equipment using closed loop control to achieve the setpoints specified by energy storage controller 506. In various embodiments, BMS 606 may be combined with controller 506 or may be part of a separate building management system. According to an exemplary embodiment, BMS 606 is a METASYS® brand building management system, as sold by Johnson Controls, Inc.

Controller 506 may monitor the status of the controlled building using information received from BMS 606. Controller 506 may be configured to predict the thermal energy loads (e.g., heating loads, cooling loads, etc.) of the building for plurality of time steps in an optimization period (e.g., using weather forecasts from a weather service 604). Controller 506 may generate control decisions that optimize the economic value of operating system 550 over the duration of the optimization period subject to constraints on the optimization process (e.g., energy balance constraints, load satisfaction constraints, etc.). The optimization process performed by controller 506 is described in greater detail below.

Controller 506 is shown to include a communications interface 636 and a processing circuit 607 having a processor 608 and memory 610. These components may be the same as described with reference to FIG. 6A. For example, controller 506 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 506 may be the same as previously described with reference to FIG. 6A.

Planning Tool

Figure 7:
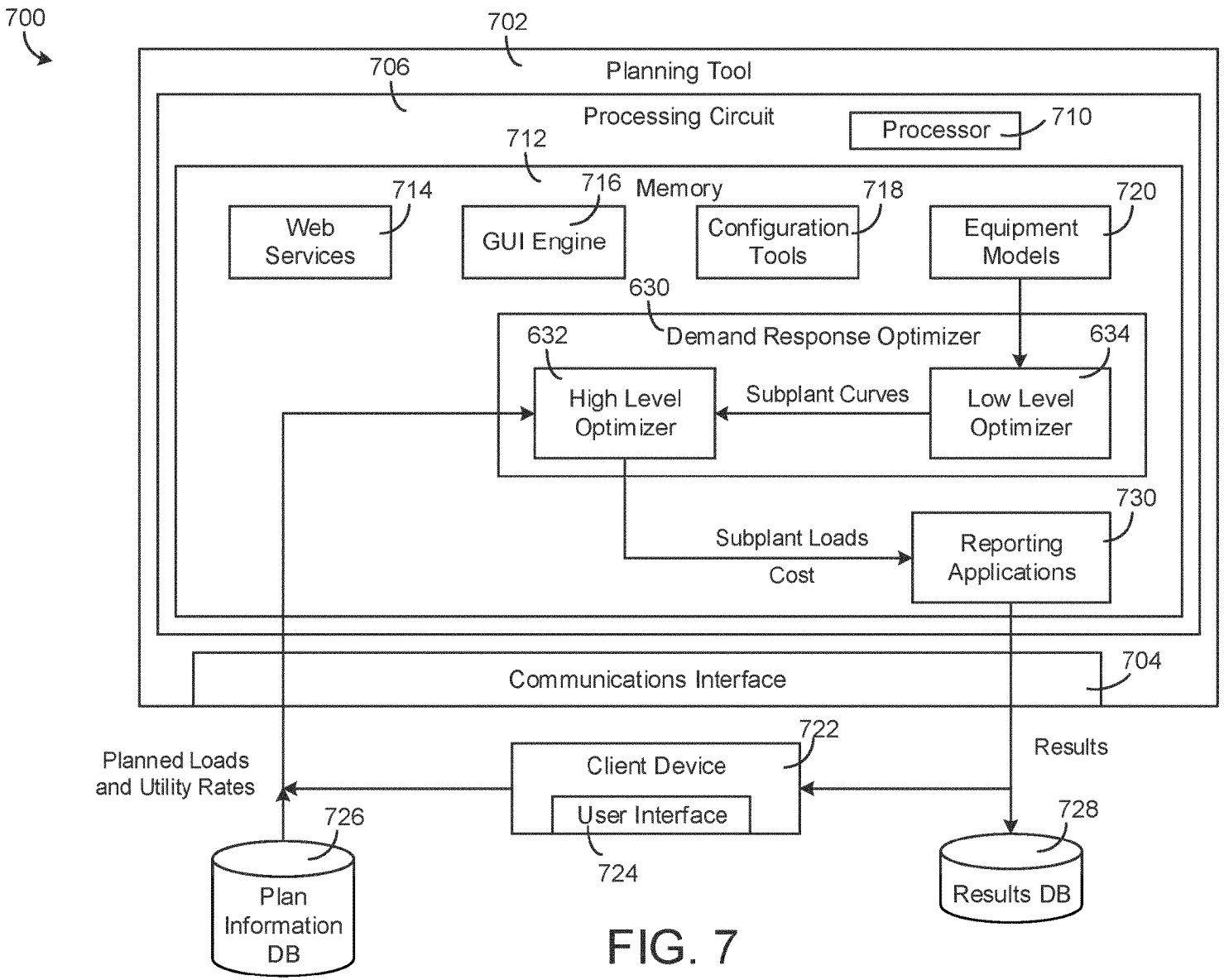
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
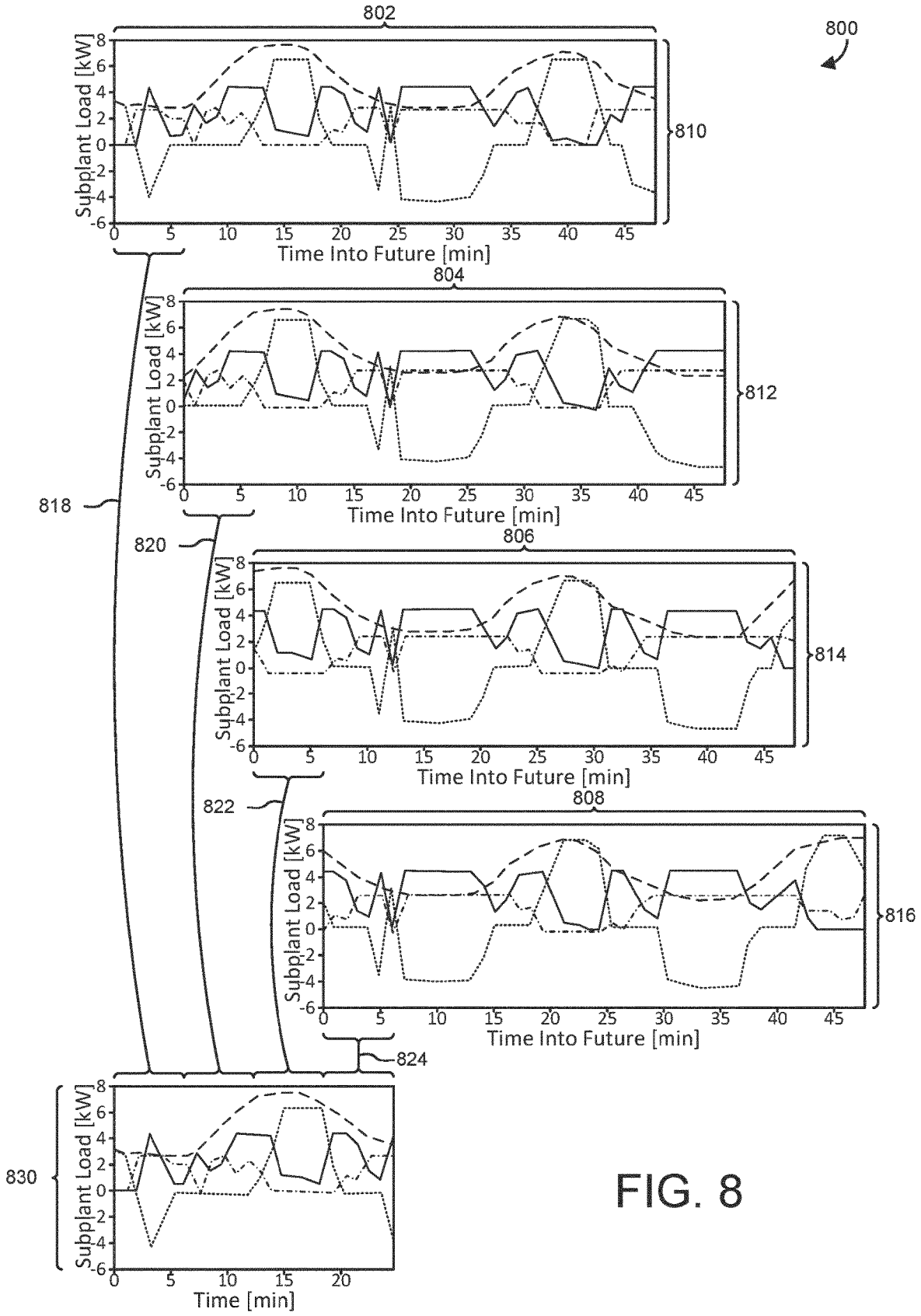
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
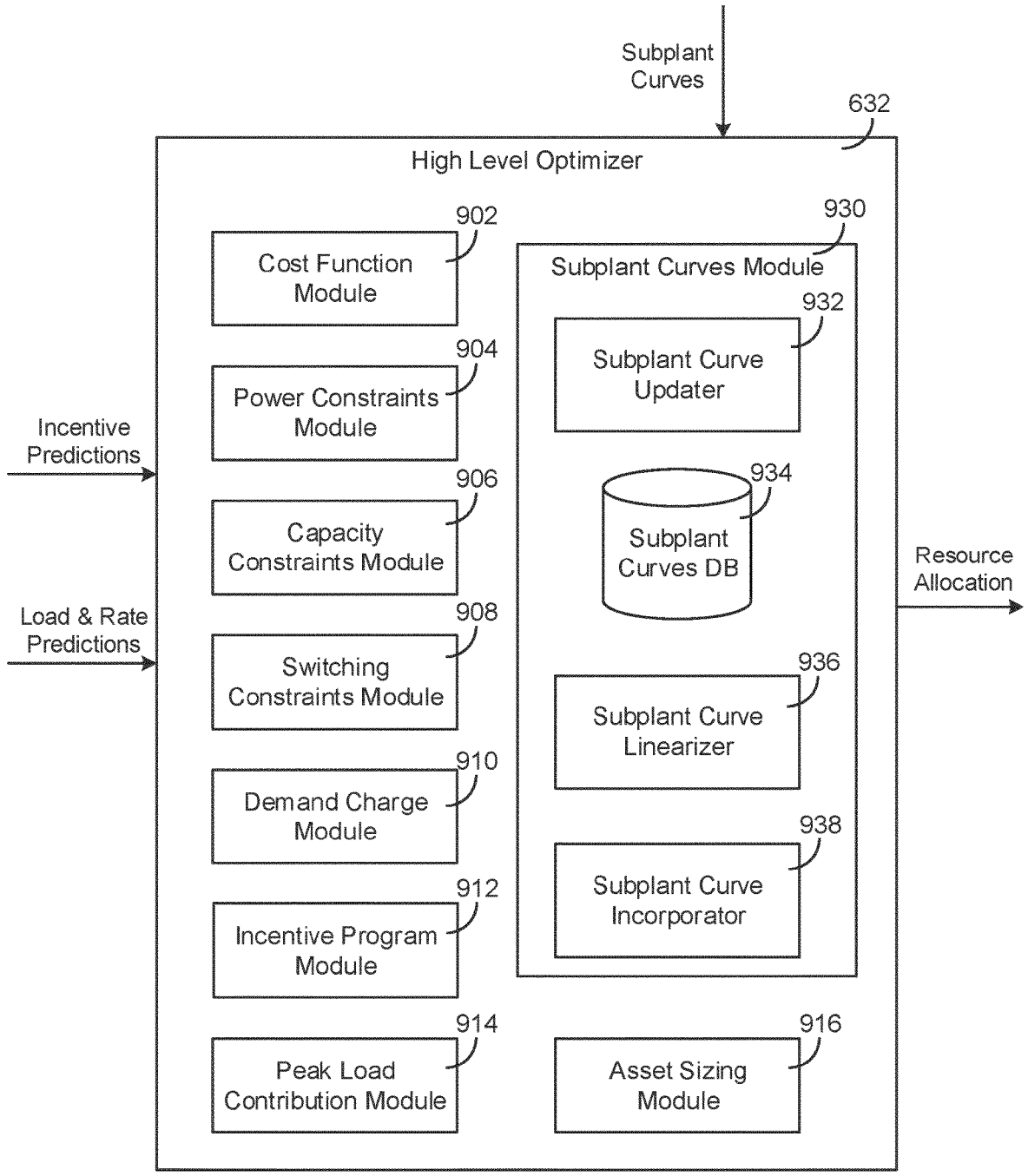
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 506, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\underset{x}{\operatorname{argmin}} J(x)$$

where J(x) is defined as follows:

$$J(x) = \sum_{source} \sum_{horizon} \text{cost}(\text{purchase}_{resource,time}, \text{time}) - \sum_{incentive} \sum_{horizon} \text{revenue}(\text{ReservationAmount})$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} \text{purchase}_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0$$

$$\forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources} \left[ \sum_{q \in demands_s} w_{demand,s,q} r_{demand,s,q} \max_{i \in demand_{s,q}} (\text{purchase}_{s,i}) + \sum_{horizon} r_{s,i} \text{purchase}_{s,i} \right] - \sum_{incentives} \sum_{horizon} \text{revenue}(\text{ReservationAmount})$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $\text{purchase}_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} +$$

-continued $$\sum_{i=k}^{k+h-1} r_{s_i}\left|P_{bat_i} - P_{bat_{i-1}}\right| + w_d r_d \max_i\left(-P_{bat_i} + eLoad_i\right)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., \$/kWh) at time step i, $P_{FR,i}$ is the battery power (e.g., kW) committed to frequency regulation participation during time step i, $r_{FR_i}$ is the incentive rate (e.g., \$/kWh) for participating in frequency regulation during time step i, $r_d$ is the applicable demand charge (e.g., \$/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i}+P_{FR_i}\leq P_{eff}$$

$$-P_{bat_i}+P_{FR_i}\leq P_{eff}$$

$$P_{bat_i}+P_{FR_i}\leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff}=P_{rated}-Pd_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR}P_{FR_i} \\ C_a - \sum_{n=k}^{i} P_{bat_n} \geq C_{FR}P_{FR_i} \end{cases} \quad \forall\, i = k \ldots k+h-1$$

$$\begin{cases} C_a - \sum_{n=k}^{i} P_{bat_n} \leq C_{eff} - C_{FR}P_{FR_{i+1}} \\ C_a - \sum_{n=k}^{i} P_{bat_n} \geq C_{FR}P_{FR_{i+1}} \end{cases} \quad \forall\, i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff}-C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff}-C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff}-C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff}-C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff}=(1-C_{FR}-2C_{socCM})C_{rated}-C_{PV\ FirmingReserve}$$

where $C_{socCM}$ is the control margin and $C_{PV\ FirmingReserve}$ is the capacity reserved for photovoltaic firming.

Still referring to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i}\left|P_{bat_i}-P_{bat_{i-1}}\right|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i>P_{bat_i}-P_{bat_{i-1}}\ \forall i=k\ldots k+h-1$$

$$s_i>P_{bat_{i-1}}-P_{bat_i}$$

Switching constraints module 908 can replace the nonlinear switching term in the cost function J(x) with the following linearized term:

$$\sum_{i=k}^{k+h-1} r_{s_i}s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demands_{s,q}} (\text{purchase}_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demands_{s,q}} (g_{s,q,i} \text{purchase}_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$ and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ $\forall$i=1, 2, 3, 8, 9, 10) and active during time steps i=4, 5, 6, 7, 11, 12 (i.e., $g_{s,q,i}=1$ $\forall$i=4, 5, 6, 7, 11, 12). Accordingly, the term $g_{s,q,i}\text{purchase}_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

$$J(x) = \ldots + w_{d_1} r_{d_1} \max_i (g_{1_i}(-P_{bat_i} + eLoad_i)) + \ldots + w_{d_q} r_{d_q} \max_i (g_{q_i}(-P_{bat_i} + eLoad_i)) + \ldots + w_{d_N} r_{d_N} \max_i (g_{N_i}(-P_{bat_i} + eLoad_i))$$

where the term $-P_{bat_i}$ $eLoad_i$ represents the total amount of electricity purchased from the electric grid during time step i (i.e., the total electric load $eLoad_i$ minus the power discharged from the battery $P_{bat_i}$). Each demand charge=1 . . . N can be accounted for separately in the cost function J(x) by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge a. In the case of the previous example, this will result in N auxiliary variables $d_1 \ldots d_N$ being introduced as decision variables in the cost function J(x). Demand charge module 910 can modify the cost function J(x) to include the linearized demand charge terms as shown in the following equation:

$$J(x)= \ldots + w_{d_1} r_{d_1} d_1 + \ldots + w_{d_q} r_{d_q} d_q + \ldots + w_{d_N} r_{d_N} d_N$$

Demand charge module 910 can impose the following constraints on the auxiliary demand charge variables $d_1 \ldots d_N$ to ensure that each auxiliary demand charge variable represents the maximum amount of electricity purchased from the electric utility during the applicable demand charge period:

$$d_i \geq g_{1_i}(-P_{bat_i} + eLoad_i) \quad \forall\, i = k \ldots k+h-1, \quad g_{1_i} \neq 0$$
$$d_1 \geq 0 \qquad \vdots$$
$$d_q \geq g_{q_i}(-P_{bat_i} + eLoad_i) \quad \forall\, i = k \ldots k+h-1, \quad g_{q_i} \neq 0$$
$$d_q \geq 0 \qquad \vdots$$
$$d_N \geq g_{N_i}(-P_{bat_i} + eLoad_i) \quad \forall\, i = k \ldots k+h-1, \quad g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 . . . 3), where $g_q$ includes an element for each time step of the optimization period (i.e., $g_q=[g_{q_1} \ldots g_{q_{24}}]$). The three demand charge masks can be defined as follows:

$$g_{1_i}=1\,\forall i=1 \ldots 24$$

$$g_{2_i}=1\,\forall i=12 \ldots 18$$

$$g_{3_i}=1\,\forall i=9 \ldots 12,18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources.

For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} \left( \mathrm{adjCBL}_i - \left( \mathrm{eLoad}_i - P_{bat_i} \right) \right) \right)$$

where $b_i$ is a binary decision variable indicating whether to participate in the ELDR program during time step i, $r_{ELDR_i}$ is the ELDR incentive rate at which participation is compensated, and $\mathrm{adjCBL}_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3} \left( \mathrm{eLoad}_p - P_{bat_p} - \sum_{l=1}^{4} \frac{e_{lp}}{4} \right) - \left( \mathrm{eLoad}_i - P_{bat_i} \right) \right) \right)$$

where $e_{li}$ and $e_{lp}$ are the electric loads at the 1th hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall\, i / r_{DA_i} \geq \mathrm{NBT}_i \text{ and } i \in S \\ 0 & \text{otherwise} \end{cases}$$

where $r_{DA_i}$ is the hourly day-ahead price at the ith hour, $\mathrm{NBT}_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = \sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May 31' of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$\mathrm{PLC}_{customer} = \mathrm{CLF} \times \sum_{i=1}^{5} \frac{\mathrm{eLoad}_{cp_i}}{5}$$

where $\mathrm{PLC}_{customer}$ is the customer's peak load contribution calculated during year Y, CLF is the capacity loss factor (e.g., CLF=1.05), and $\mathrm{eLoad}_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$\mathrm{PLC}_{cost} = r_{PLC} \times \mathrm{PLC}_{customer}$$

where $\mathrm{PLC}_{cost}$ is the customer's PLC charge billed over the delivery year Y+1 (e.g., \$) and $r_{PLC}$ is the rate at which the customer is charged for its PLC (e.g., \$/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} \mathrm{eLoad}_{cp_i}}{\sum_{i=1}^{5} \mathrm{sysLoad}_{cp_i}}$$

where $\mathrm{sysLoad}_{cp_i}$ is the region-wide peak load during the ith CP hour and $\mathrm{eLoad}_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$\mathrm{GA}_{cost,month} = \theta_{PDF} \times \mathrm{GA}_{total,month}$$

where $\mathrm{GA}_{cost,month}$ is the customer's monthly PLC cost (e.g., \$) and $\mathrm{GA}_{total,month}$ is the region-wide global adjustment cost (e.g., \$). The value of $\mathrm{GA}_{total,month}$ may be specified by IESO. In some embodiments, $\mathrm{GA}_{total,month}$ has a known value. In other embodiments, the value of $\mathrm{GA}_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function J(x). For example, the cost function J(x) may include terms corresponding to energy cost, multiple demand charges, PLC charges, and/or IBDR revenue, as previously described. Adding one or more new assets may affect the values of some or all of these terms in the original cost function J(x). For example, adding a battery asset may increase IBDR revenue and decrease energy cost, demand charges, and PLC charges. However, the original cost function J(x) may not account for the fixed and marginal costs resulting from new asset purchases. In order to account for these fixed and marginal costs, asset sizing module 916 may add new terms to the original cost function J(x).

Asset sizing module 916 can be configured to augment the cost function J(x) with two new terms that correspond to the cost of purchasing the new assets, resulting in an augmented cost function $J_a(x)$. The additional terms are shown in the following equation:

$$J_a(x) = J(x) + c_f^T v + c_s^T s_a$$

where J(x) is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_a(x)$.

In some embodiments, asset sizing module 916 scales the asset purchase costs $c_f^T v$ and $c_s^T s_a$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_a$ by the ratio $$\frac{h}{SPP}$$

as shown in the following equation:

$$J_a(x) = J(x) + \frac{h}{8760 \cdot SPP}\left(c_f^T v + c_s^T s_a\right)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector $s_a$. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector $s_a$.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve.

Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Battery Powered Vehicle Cost Optimization

Figure 10:
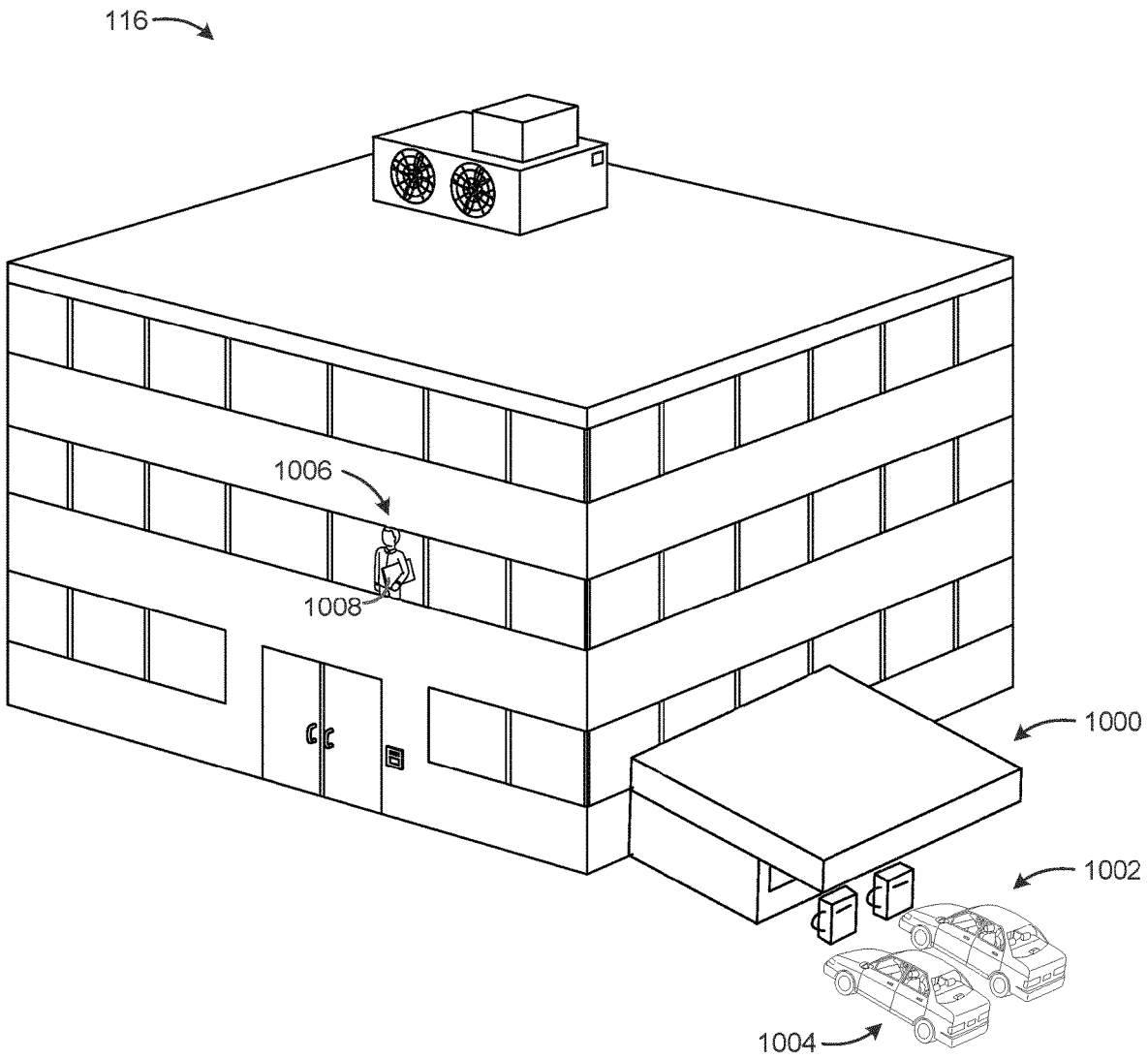
FIG. 10 is a drawing illustrating a building and battery powered vehicles charging at a charging station of the building, according to an exemplary embodiment.

Referring now to FIG. 10, a diagram of the building 116 of FIG. 1 is shown in greater detail, according to an exemplary embodiment. The building 116 of FIG. 10 may be any kind of commercial or residential building. For example, the building 116 may be an apartment complex, a residential home, hotel, etc. Furthermore, the building 116 may be a commercial building, a workplace, a gas station, a casino, a grocery store, an airport, etc. The building 116 is shown to include a vehicle charging system 1000. The building 116 may include or otherwise be associated with the vehicle charging system 1000. For example, the vehicle charging system 1000 may be directly integrated with the building 116 (as shown in FIG. 10) or may be located remote from the building 116.

The vehicle charging system 1000 can be configured to charge and/or discharge battery powered vehicles 1002 and 1004. The vehicle charging system 1000 can be configured to connect to the battery powered vehicles 1002-1004 via charging cables and charge and/or discharge vehicle batteries of the battery powered vehicles 1002-1004. The vehicle charging system 1000 can be configured to cause the batteries of the battery powered vehicles 1002-1004 to charge via an electric grid, from power sources of the building 116, or from other battery powered vehicles. For example, the vehicle charging system 1000 can be configured to cause the battery powered vehicle 1002 to be charged from the battery powered vehicle 1004.

The vehicle charging system 1000 can, in some embodiments, utilize smart entity technology. The implementation of smart entities is described in detail in U.S. Provisional Patent Application No. 62/611,974 filed Dec. 29, 2017, and U.S. Provisional Patent Application No. 62/611,984 filed Dec. 29, 2017. The entire disclosures of both these patent applications are incorporated by reference herein. The vehicle charging system 1000 can authenticate the battery powered vehicles 1002-1004 when the battery powered vehicles 1002-1004 are parked in a particular proximity with the vehicle charging system 1000 and/or are connected to charge with the charging system 1000. In some embodiments, the authentication is frictionless, i.e., the authentication is performed via wireless communication (RFID). In response to authenticating the vehicle, a particular charging program, as discussed in greater detail herein, can automatically be selected for each of the battery powered vehicles 1002-1004.

The battery powered vehicles 1002-1004 may be vehicles that allow for user transportation. The battery powered vehicles 1002-1004 may be fully or partially electrically powered. For example, the battery powered vehicles 1002-1004 may be fully electric vehicles, hybrid vehicles, or gas powered vehicles that include car batteries. The battery powered vehicles 1002-1004 may be passenger sedans, trucks, minivans, delivery vehicles, etc. Furthermore, the battery powered vehicles 1002-1004 may be autonomous, controlled via a network connection, and/or manually operated by a driver.

In FIG. 10, a user 1006 is shown located in the building 116. The user 1006 may be associated with the vehicle 1002. For example, the user 1006 may own and/or operate the vehicle 1002, may rent the vehicle 1002, etc. The user 1006 may cause the battery powered vehicle 1002 to charge via the charging system 1000. The user 1006 may be a resident of the building 116, a worker of the building 116, or may otherwise visit and/or be in the building 116. When the user arrives at the building 116, the user may park the battery powered vehicle 1002 and cause the battery powered vehicle 1002 to charge via the charging system 1000.

In some embodiments, the building 116 may include various energy consuming components, e.g., chillers, airside units, etc. These energy consuming components can be powered, at least in part, by the batteries of the battery powered vehicles 1002-1004. Furthermore, the building 116 may participate in a buy-back program where an electric utility buys back electric power from the building 116. The vehicle charging system 1000 can be configured to discharge the batteries of the battery powered vehicles 1002-1004 so that the building 116 can utilize the power from the battery powered vehicles 1002-1004 to participate in the various programs that a utility may offer, e.g., incentive-based demand response (IBDR) programs. Examples of such programs may include Frequency Regulation, and Economic Load Demand Response (ELDR). The vehicle charging system 1000 can be configured such that the battery powered vehicles 1002-1004 are charged yet the building 116 generates the most profit or reduces costs of purchasing energy by discharging the batteries of the battery powered vehicles 1002-1004 or selecting optimal charging rates for the battery powered vehicles 1002-1004.

The batteries of the battery powered vehicles 1002-1004 may be used such that power is "bought back" from the batteries of the battery powered vehicles 1002-1004 for participation in the various programs. Buying back power from a mobile battery can further be performed from charging stations for mobile devices (e.g., tablets, laptops, smartphones, etc.).

For example, the building 116 may include a charging station at which users can plug in their mobile devices that include batteries. In this regard, a user can leave their mobile device at the charging station, select a charging program for their mobile device, and leave their device at the charging station as their device charges. The charging system may include one or more storage compartments which include connections for connecting the mobile device to a charging/discharge source but can be locked for safe keeping of the user's device.

In some embodiments, the building 116 may include special wall power outlets for charging or discharging a battery. This wall power outlet can be configured to source power from a battery powered mobile device connected to the outlet or provide power to the device connected to the outlet. As an example, if the building 116 is an apartment building, each apartment may be fitted with one or more of the power outlet charging/discharging outlets. In this regard, a user could plug in their own battery powered device to their apartment wall, via the specialized power outlet, and generate revenue for the building and/or themselves. The battery powered device plugged into the specialized power outlet may be a smartphone, tablet, laptop, etc. In some embodiments, the battery powered device may be a special battery unity which the user may purchase and maintain in order to generate revenue.

The user 1006 is shown to be associated with a mobile device 1008. The mobile device 1008 may be a tablet computer, a laptop computer, a smartphone, or any other portable electronic user device. The mobile device 1008 may be configured to track the location of the user 1006 via a global positioning system (GPS) or may be include a network interface for connecting to mobile network that the systems of the building 116 can utilize to track the location of the user 1006 within the building 10. Examples of such tracking systems can be found in U.S. patent application Ser. No. 15/812,260 filed on Nov. 14, 2017 and U.S. patent application Ser. No. 14/263,639 filed Apr. 28, 2014, the entireties of which are incorporated by reference herein.

Based on the location of the user 1006 as determined via tracking the user 1006 via the mobile device 1008 or by interfacing with applications of the mobile device 1008 (e.g., a personal calendar, a business calendar, etc.) the systems of the building 116 can determine a departure time, a time at which the user 1006 will disconnect the battery powered vehicle 1002 from the charging system 1000. The departure time can be a time that the user specifics on a kiosk of the vehicle charging system 1000 and/or via a mobile phone. Furthermore, via the kiosk or the mobile phone, the user may be able to select a particular charging program.

A first charging program may be to charge or discharge the battery of a battery powered vehicle subject to constraints to optimally charge the battery and reach a predefined battery charge level at the departure time. A second charging program may be to charge at whatever charging rate is optimal, never discharge the battery, and reach the desired charge level at the departure time. A third charging program may be too quickly charge the battery of the battery powered vehicle at a predefined rate. This charging program may charge the battery powered vehicle as fast as possible.

Based on the departure time, the systems of the building 116 can be configured to cause the vehicle charging system 1000 to charge and/or discharge the vehicle 1002 such that it is fully charged (or charged to an acceptable amount) when the user 1006 will disconnect the battery powered vehicle 1002 from the vehicle charging system 1000.

Figure 11:
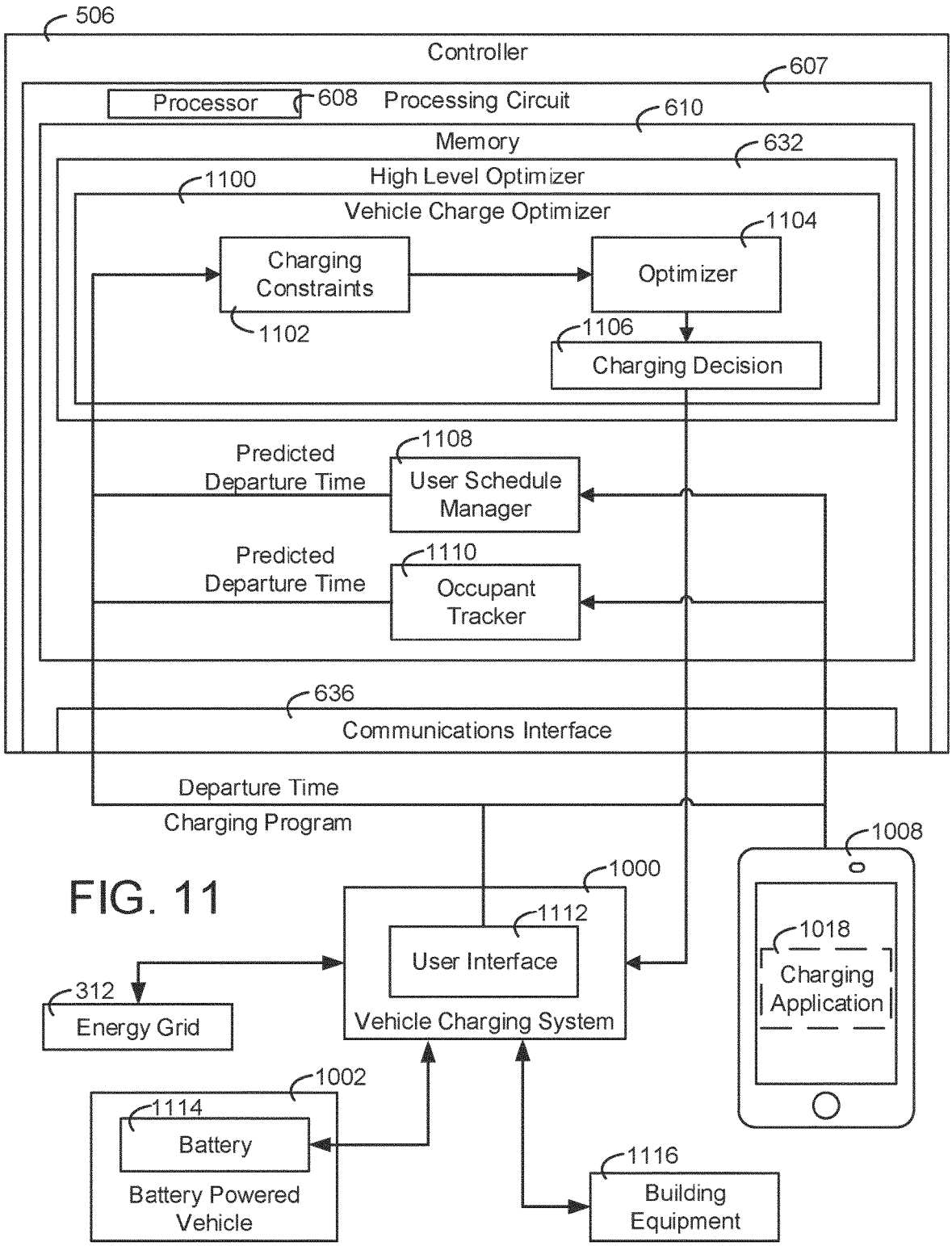
FIG. 11 is a block diagram of the controller of FIG. 6A configured to optimize charging and discharging a battery one of the battery powered vehicles of FIG. 10, according to an exemplary embodiment.

Referring now to FIG. 11, a block diagram of the controller 506 including a vehicle charge optimizer 1100 is shown, according to an exemplary embodiment. FIG. 11 is further shown to include the vehicle charging system 1000 of FIG. 10 and the battery powered vehicle 1002 of FIG. 10. The vehicle charging system 1000 is shown to be connected to the energy grid 312, a battery 1114 of the battery powered vehicle 1002, and building equipment 1116. The vehicle charging system 1000 can be configured to charge the battery 1114 of the battery powered vehicle 1002 via the energy grid 312. Furthermore, the vehicle charging system 1000 can be configured to discharge the battery 1114 and provide power to the energy grid 312 by discharging the battery 1114.

Furthermore, the vehicle charging system 1000 can be configured to charge the battery 1114 using power generated by power generating or power storing components of building equipment 1116. In a similar manner, the vehicle charging system 1000 can be configured to charge discharge the battery 1114 to provide power to the building equipment 1116 or other power-consuming equipment. In some embodiments, the vehicle charging system 1000 is configured to discharge a first battery of a first battery powered vehicle to charge a second battery of a second battery powered vehicle.

The controller 506 can be configured to perform optimizations to determine how to optimally charge and/or discharge the battery 1114 of the battery powered vehicle 1002. In this regard, the controller 506 can cause the vehicle charging system 1000 to charge and/or discharge the battery 1114. In some embodiments, the controller 506 is a local system, device, server, or computer of the building 116. In some embodiments, the controller 506 is a remote system, device, server, or computer communicatively coupled to the vehicle charging system 1000. In some embodiments, the vehicle charging system 1000 includes the controller 506 or is otherwise configured to perform the functionality of the controller 506.

The memory 610 of the processing circuit 607 is shown to include a vehicle charge optimizer 1100 (shown to be a component of the high level optimizer 632 in FIG. 11). Furthermore, the memory 610 is shown to include a user schedule manager 1108 and an occupant tracker 1110. The vehicle charge optimizer 1100 can be configured to determine when and at what rate, to charge or discharge the battery 1114. This determination may be the charging decision 1106. The charging decision 1106 may include a rate at which to charge or discharge the battery 1114 at multiple time steps into the future over the duration of an optimization window. The vehicle charge optimizer 1100 can be configured to generate a cost function that includes the cost and/or revenue of charging and/or discharging the battery 1114 (also referred to as an objective function), such as the cost function shown below. The cost function may include terms that contribute to overall cost for the building 116, e.g., electricity purchases from the energy grid 312 and revenue received from incentive programs.

$$\underset{x}{\operatorname{argmin}} J(x)$$

where J(x) is defined as follows:

$$J)(x) = \sum_{sources} \sum_{horizon} \text{cost}(\text{purchase}_{resource,time}, \text{time}) - \sum_{incentives} \sum_{horizon} \text{revenue}(\text{ReservationAmount})$$

The vehicle charge optimizer 1100 can be configured to generate the cost function to be optimized with charging constraints 1102, e.g., parameters indicative of the battery 1114 and/or any other constraints necessary for various pieces of building equipment 1116 and/or the energy grid 312. Various optimization constraints may be generated by the vehicle charge optimizer 1100 that can be used to optimize the objective function. The constraints may be to only charge in a particular manner. For example, to only charge the battery 1114 and never discharge the battery. This may allow the vehicle charge optimizer 1100 to adjust the rate at which the battery 1114 charges over the optimization window but never discharge the battery. Furthermore, the vehicle charge optimizer 1100 can generate a constraint to allow the battery 1114 to both charge and discharge so long as the battery 1114 is fully charged at a particular departure time, a time at which the battery powered vehicle 1002 needs to be ready to be driven.

The battery parameters can be implemented as constraints on the values of the variables of the cost function. For example, energy purchased at a particular time step may be equal to energy consumed by equipment (e.g., the building equipment 1116) at the particular time step plus the energy charged into the battery at the time step. This type of constraint may be an example of an equality constraint. Another constraint may be that the rate at which energy is charged into the battery at the time step may be constrained to be less than or equal to a maximum battery charge rate. This may be an example of an inequality constraint. Another constraint may be that the state of charge of the battery at a future time step is equal to the state of charge at a previous time step plus the energy charged into the battery during the previous time step so that the state of charge accurately reflects the charging and discharging decisions.

In some embodiments, the charging constraints 1102 are generated dynamically based on user-specified information received from the user device 1008 (e.g., the charging application 1018) and/or the vehicle charging system 1000 (e.g., the user interface 1112). The charging constraints 1102 may be implemented as constraints on battery charge and/or discharge rate and/or the battery state of charge. In this regard, there may be multiple sets of charging constraints for multiple battery powered vehicles (e.g., the battery powered vehicles 1002-1004) that can be simultaneously optimized.

Using the battery powered vehicle 1002 and the user 1006 associated with the battery powered vehicle 1002 as an example, the user may specify information including a departure time and how the user 1006 would like the battery 1114 to charge. For example, the user 1006 may indicate that the battery 1114 charge as fast as possible. Furthermore, the user 1006 may indicate that the battery 1114 charge and/or discharge at any acceptable rate so long as he battery 1114 reaches a predefined charge amount by the specified departure time. Another charging selection may be to only charge and never discharge the battery 1114 but use any rate of charge that is optimal. This selection may cause the battery 1114 to never discharge but to reach the predefined charge amount at the departure time. Furthermore, the charging constraints 1102 can be generated based on the predicted departure times generated by the user schedule manager 1108 and/or the occupant tracker 1110. The predicted departure time may be used as the departure time for the charging constraints 1102 if the user 1106 does not specify a departure time. Furthermore, the predicted departure time may be used by the vehicle charge optimizer 1100 as an update to the user-specified departure time in the event that the predicted departure time is different than the user-specified departure time. Any change in departure time and/or charging program may cause the vehicle charge optimizer 1100 to perform a new optimization and determine new rates at which to charge or discharge the battery 1114 over an optimization window.

The vehicle charge optimizer 1100 is shown to include charging constraints 1102, optimizer 1104, and the charging decision 1106. The charging constraints 1102 may be various constraints which govern how the optimizer 1104 optimizes a cost function which includes the cost and/or revenue of charging and/or discharging the battery 1114 of the battery powered vehicle 1002. The charging constraints 1102 may be included with other constraints for optimizing the consumption of resource of the building 116 and can be used to maximize revenue, minimize cost, or perform any other kind of optimization based on an amount of available resources of the energy grid 312 and various incentive programs offered by the energy grid 312. The optimization may consider current building load amounts (or predicted future building load amounts), current available resources, prices for such resources, future available resources, prices for the future resources, and can be used to determine cost parameters and perform an optimization to determine whether to charge or discharge the battery 1114 at multiple time steps into the future at particular charge or discharge rates (e.g., the charging decision 1106).

The optimization for the battery powered vehicles may include various constraints for various pieces of building equipment of a building or an energy grid (e.g., maximum rate at which power can be drawn from the grid or supplied to the grid). These constraints may be the same as and/or similar to the constraints of the power constraints module 904, the capacity constraints module 906, the switching constraints module 908, and/or any other constraints described with reference to FIG. 9 or elsewhere herein.

As previously described, the power constraints of the power constraints module 904 can be:

$$P_{bat_i}+P_{FR_i}\leq P_{eff}$$

$$-P_{bat_i}+P_{FR_i}\leq P_{eff}$$

$$P_{bat_i}+P_{FR_i}\leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff}=P_{rated}-P_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

A subset of the constraints may include charging constraints that are specific to the battery powered vehicles. The charging constraints may be, for example, maximum charge rates, maximum discharge rates, maximum state of charge, minimum state of charge, specified charge level at a given time, etc. The charging constraints may include equality constraints and/or inequality constraints. As an example of an equality constraint is an energy balance constraint for vehicle charging system 1000. For example, an equality constraint may specify:

$$P_{grid,k}-P_{equip,k}-P_{bat,k}=0$$

where $P_{grid,k}$ is the amount of power received from the energy grid 312 at time step k, $P_{equip,k}$ is the amount of power consumed by the building equipment 1116 at time step k, and $P_{bat,k}$ is the amount of power discharged from the battery 1114 at time step k. Another example of an equality constraint is a constraint that models the state-of-charge of the battery 1114. For example, an equality constraint may specify:

$$SOC_{k+1}=SOC_k-P_{bat,k}\Delta t$$

where $SOC_{k+1}$ is the state-of-charge of the battery 1114 at time step k+1, $SOC_k$ is the state-of-charge of the battery 1114 at time step k, and $P_{bat,k}$ is the rate at which the battery 1114 is discharged during time step k (i.e., battery discharge power), and Δt is the duration of each time step. Equality constraints may define relationships between variables and/or the evolution of a single variable over time.

An inequality constraint may be a constraint that limits the maximum or minimum value of a variable. One example of an inequality constraint is a constraint that limits the maximum state-of-charge of the battery 1114 (e.g., $SOC_k \leq SOC_{max}$). Another example of an inequality constraint that limits the maximum rate at which the battery 1114 can be charged or discharged. For example, the constraint:

$$P_{bat,min} \leq P_{bat,k} \leq P_{bat,max}$$

specifies that the rate $P_{bat,k}$ at which the battery is discharged must be between a minimum battery power $P_{bat,min}$ (e.g., a negative value indicating a maximum charge rate) and $P_{bat,max}$ (e.g., a positive value indicating a maximum discharge rate). Another example of an inequality constraint is a constraint that limits the amount of power $P_{grid,k}$ received from energy grid at any time step k to be less than or equal to the maximum amount of power that the energy grid 312 is able to provide. This inequality constraint is shown by the equation below:

$$P_{grid,k} \leq P_{grid,max}$$

where $P_{grid,k}$ is the amount of power received from energy grid 312 at time step k and $P_{grid,max}$ is the maximum power that energy grid 312 is capable of providing at any given time step.

The charging constraints 1102 can be based on the time period during which the battery powered vehicle 1002 is connected to the vehicle charging system 1000. For example, the charging constraints may specify that $P_{bat,k}=0$ for all time steps k during which the battery powered vehicle 1002 is not present at the vehicle charging system 1000 and therefore cannot exchange energy with the vehicle charging system. Another charging constraint 1102 may be based on a departure time. The departure time may be a particular time at which the user 1006 wants to use the battery powered vehicle 1002. A charging constraint 1102 may be that the battery 1114 is fully charged, or charged to a predefined amount, at the departure time. For example, a charging constraint may specify that the state-of-charge of the battery 1114 is equal to a fully charged value or predefined charge value at a particular time step N (e.g., $SOC_N=SOC_{max}$, where time step N is the departure time). In some embodiments, the departure time is received from a user interface 1112 of the vehicle charging system 1000. For example, when the user parks their car at the vehicle charging system 1000, they may enter information into the user interface 1112, the information may include a departure time. Furthermore, in some embodiments, the departure time charging constraint 1102 may be received from the user 1006 via the mobile device 1008.

In some embodiments, the constraints 1102 may impose limits on the trajectory of the state-of-charge of the battery 1114 over a future optimization window. For example, the constraint $SOC_k \geq SOC_{k-1}$ specifies that the state-of-charge of the battery 1114 at each time step k must be greater than or equal to the state-of-charge of the battery 1114 at the previous time step k−1. This constraint may indicate that the state-of-charge of the battery 1114 must only increase or stay the same between consecutive time steps. Alternatively, this constraint can be eliminated to allow the battery 1114 to charge and/or discharge over the duration of the optimization window.

In some embodiments, the constraints 1102 may include the ability to utilize a car as a generator. For example, some vehicles may include alternators that can be utilized to generate power to be consumed by the vehicle charging system 1000. The vehicle charging system 1000 may be configured to automatically start and run such a car to generate power. In some embodiments, a special charging constraint 1102 may be included in the optimization so that turning on the vehicle and using it as a "generator" can be performed.

Furthermore, some of the charging constraints 1102 may be ramp rate constraints. For example, the rate at which the battery 1114 is charged or discharged may be constrained to increase gradually and/or decrease gradually from a starting time or prior to a stopping time. For example, the constraint $P_{bat,k-1}-\Delta P_{max} \leq P_{bat,k} \leq \Delta P_{max}$ specifies that the battery charging or discharging power $P_{bat,k}$ must not change by more than $\Delta P_{max}$ relative to the battery charging or discharging power $P_{bat,k-1}$ at the previous time step. The constraints 1102 may cause the battery 1114 to approach a particular charge level at a particular rate for a particular departure time.

In some embodiments, the charging constraints 1102 may be based on a predicted departure time. The predicted departure time may be received from the user schedule manager 1108 and/or the occupant tracker 1110. The predicted departure time may be a time that either the user schedule manager 1108 and/or the occupant tracker 1110 predicts as the departure time. The optimizer 1104 may treat the predicted departure time the same as (or similar to) an actual user-entered departure time. In some embodiments, the predicted departure time is associated with a different charge level than an actual user entered departure time. For example, for an actual user entered departure time may be a charging constraint 1102 that causes the optimizer 1104 to cause the vehicle charging system 1000 to fully charge (or charge to a particular charge level) the battery 1114 by the departure time. However, for a predicted departure time, the time may be a second charge level a predefined amount less than the first charge level (e.g., 70% charged instead of 100% charged) or in some embodiments, a higher charge level than the first charge level. For example, an amount of charge overhead may need to be taken into account for a predicted departure time, i.e., the user may actually leave sooner than the predicted departure time.

In some embodiments, the charging constraints 1102 include a prediction of occupancy. For example, based on the user schedule manager 1108, or the occupant tracker 1110, a number of occupants can be determined within the building 116. Furthermore, various other occupancy determination systems, e.g., PIR occupancy sensors, access control systems, etc. can be interfaced with the controller 506 to determine a number of occupants within the building 116. This number of occupants in the building 116 can be recorded over time. In some embodiments, the historical data may be a recorded number of battery powered vehicles charging at the vehicle charging system 1000 at various times on various days. This historical occupancy data can be used to predict the number of battery powered vehicles that will be charging at various times over an optimization window.

The user schedule manager 1108 can be configured to interface with a schedule of the user 1006. In some embodiments, the user schedule manager 1108 can directly interface with the mobile device 1008 or may interface with a user account via a cloud server. The user schedule manager 1108 may identify and/or receive the various schedule events of the user 1106. The schedule may indicate various business meetings, personal meetings, times that the user will need their vehicle available, or otherwise location information of the user 1006. Based on the schedule information, the user schedule manager 1108 can be configured to generate a prediction of a departure time, i.e., the predicted departure time, and provide the predicted departure time to the vehicle charge optimizer 1100. For example, the user schedule manager 1108 may identify that the user 1006 has a workout class at a workout facility at 6:00 P.M. January 1$^{st}$. The workout facility may be located a half hour away from the building 116. Thus, the user schedule manager 1108 may predict the departure time to be 5:30 P.M. January 1$^{st}$.

The occupant tracker 1110 can be configured to generate a predicted departure time based on the location of the mobile device 1008. The occupant tracker 1110 can be configured to receive and/or determine the location of the mobile device 1008. In some embodiments, the occupant tracker 1110 receives a position of the user from a GPS of the mobile device 1008. In some embodiments, the occupant tracker 1110 can be configured to determine the location of the mobile device 1008 via wireless communication. For example, the mobile device 1008 may communicate with one or more routers or wireless emitters. Based on various signal strengths or communication activity, the occupant tracker 1110 can be configured to determine the location of the mobile device 1008. Examples of functionality for determining the location of a mobile device that can be implemented by the occupant tracker 1110 can be found in U.S. patent application Ser. No. 15/812,260 filed on Nov. 14, 2017 and U.S. patent application Ser. No. 14/263,639 filed Apr. 28, 2014, the entireties of which are incorporated by reference herein.

As an example, the user 1006 may charge the battery powered vehicle 1002 with the vehicle charging system 1000 and then walk away from the building 116 to visit a restaurant. Based on occupancy data, the occupant tracker 1110 may determine that the user 1006 is walking back to their car from the restaurant by analyzing occupancy data which may include a coordinate of the user. For example, the trend of the coordinates may indicate that the user is walking towards the car. Based on the current position, direction, and/or the speed of movement of the mobile device 1008, the occupant tracker 1110 may generate a predicted time that the user 1006 will arrive at the battery powered vehicle 1002.

As another example, the occupant tracker 1110 may track the user 1006 within the building 116 and determine whether the user is leaving the building 116. For example, if the user walks towards an elevator on the third floor of the building 116, the occupant tracker 1110 may determine a predicted departure time to occur within the next fifteen minutes. In some embodiments, the occupant tracker 1110 can estimate the length of time that it will take the user to reach the battery powered vehicle 1002 in response to location activity that indicates that the user 1006 will depart from the building 116.

The mobile device 1008 is shown to include a charging application 1018. The charging application 1018 may be a web browser application or a mobile application loaded on to the mobile device 1008 and configured to run on the mobile device 1008. The charging application 1018 can generate a user interface allowing the user to enter a departure time or select a charging program for their battery powered vehicle 1002. An example of an interface for the charging application 1018 is shown and described with further reference to FIG. 17.

The user interface 1112 of the vehicle charging system 1000 may also allow a user to select a departure time and/or a charging program. The user interface 1112 may be located at the vehicle charging system 1000 such that when the user 1006 connects their battery powered vehicle 1002 to the vehicle charging system 1000, they can interact with the user interface 1112 to select a charging program, select a departure time, facilitate a transaction in payment for charging the battery powered vehicle 1002, etc. The user interface 112 may include a touch screen interface and may be part of a kiosk system of the vehicle charging system 1000.

Figure 12:
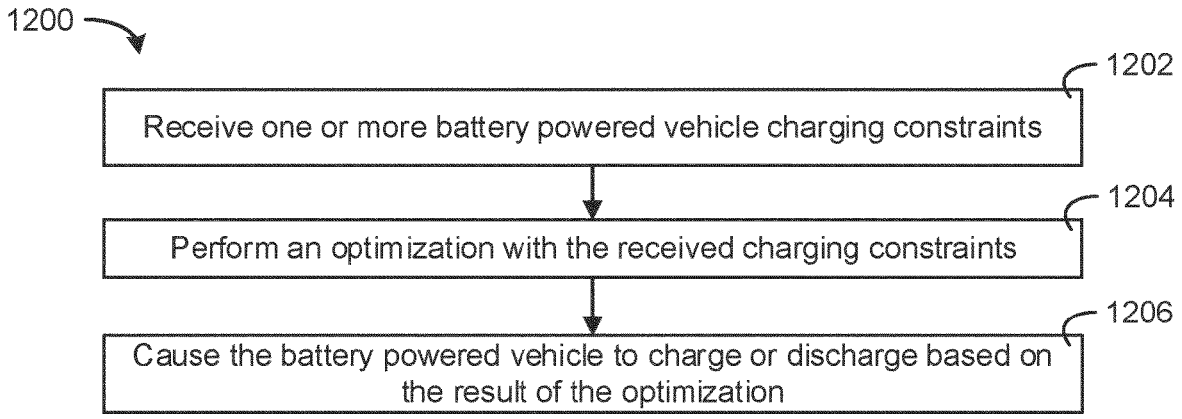
FIG. 12 is a flow diagram of a process that can be performed by the controller of FIG. 11 for performing an optimization to determine whether to charge or discharge the battery of the battery powered vehicle of FIG. 10, according to an exemplary embodiment.

Referring now to FIG. 12, a flow diagram of a process 1200 is shown for determining whether to charge and/or discharge the battery 1114, according to an exemplary embodiment. The controller 506 can be configured to perform the process 1200. Similarly, the vehicle charging system 1000 can be configured to perform the process 1200. Furthermore, any computing device described herein can be configured to perform the process 1200. However, the process 1200 is described with reference to the controller 506.

In step 1202, the vehicle charge optimizer 1100 receives the charging constraints 1102. The charging constraints 1102 may be received from the user interface 1112 and/or the charging application 1018. The charging constraints may be that the battery powered vehicle 1002 can only charge when the battery powered vehicle 1002 is connected to the vehicle charging system 1000. The charging constraint may be to charge or discharge the battery powered vehicle and/or to reach a particular charge level (e.g., 100%) at a particular departure time. Furthermore, the constraint may be to only charge the battery 1114 and never discharge the battery 1114 and/or to reach a particular charge level (e.g., 100%) at a particular departure time by charging the battery 1114 at varying rates prior to the departure time.

In some embodiments, instead of, or in addition to receiving the charging constraints 1102, the vehicle charge optimizer 1100 can be configured to automatically generate the charging constraints 1102. The charging constraints 1102 can be generated based on information received from the user schedule manager 1108, the occupant tracker 1110, the user interface 1112, and/or the charging application 1018. For example, the data received by the vehicle charge optimizer 1100 may be user-specified information. The user-specified information may be a particular charging program and a departure time. The vehicle charge optimizer 1100 can be configured to generate the charging constraints 1102 such that the battery 1114 reaches a predetermined charge level (e.g., 100%), at the departure time.

Furthermore, the charging constraints 1102 can be configured such that the predetermined charge level is reached at the departure time by charging and/or discharging the battery 1114 according to a user-specified charging program. The charging program may be a first charging program where the battery 1114 is charged or discharged at any rate so long as the predefined charge amount is reached at the departure time. The charging program may be a second charging program where the battery 1114 is only charged at varying rates but never discharged. Furthermore, the charging program may be to charge the battery 1114 at the fastest rate possible.

In some embodiments, the charging constraints 1102 are the predicted departure time generated by the user schedule manager 1108 and/or the occupant tracker 1110. The vehicle charge optimizer 1100 can generate the charging constraints 1102 based on the predicted departure time such that the battery 1114 reaches the predetermined charge amount at the departure time. In some embodiments, the predicted departure time may be generated, or otherwise change after the optimization of steps 1204-1206. In this regard, if the predicted departure time is generated (or the user enters a new user-specified departure time), the vehicle charge optimizer 1100 can be configured to generate new charging constraints 1102 and perform the optimization an additional time.

In step 1204, the vehicle charge optimizer 1100 can be configured to perform an optimization with the received charging constraints of step 1202 to optimally charge or discharge the battery 1114 of the battery powered vehicle 1002. Performing the optimization may include generating a cost function which accounts for cost or revenue from charging and/or discharging the battery 1114 of the battery powered vehicle 1002. The optimization may include maximizing revenue over a future window of time or minimizing cost for the future window of time. Based on the optimization, the optimal charging and/or discharge rates may be identified for the window and/or at particular time steps into the future (time steps of the window).

In step 1206, based on the optimization of step 1206, the vehicle charge optimizer 1100 can cause the vehicle charging system 1000 to charge or discharge the battery 1114 of the battery powered vehicle 1002. The optimization may identify particular periods of time to charge or discharge the battery 1114 and the optimal rate to charge or discharge the battery. In this regard, the vehicle charging system 1000 can charge and/or discharge the battery powered vehicle 1002 in such a way that the rate at which power is purchased from the energy grid 312 to charge the battery powered vehicle 1002, purchased from the energy grid 312 to power the building equipment 1116, provided from the battery 1114 to the building equipment 116 and/or the energy grid 312, provides an optimal cost or revenue to owners of the building 116.

Figure 13:
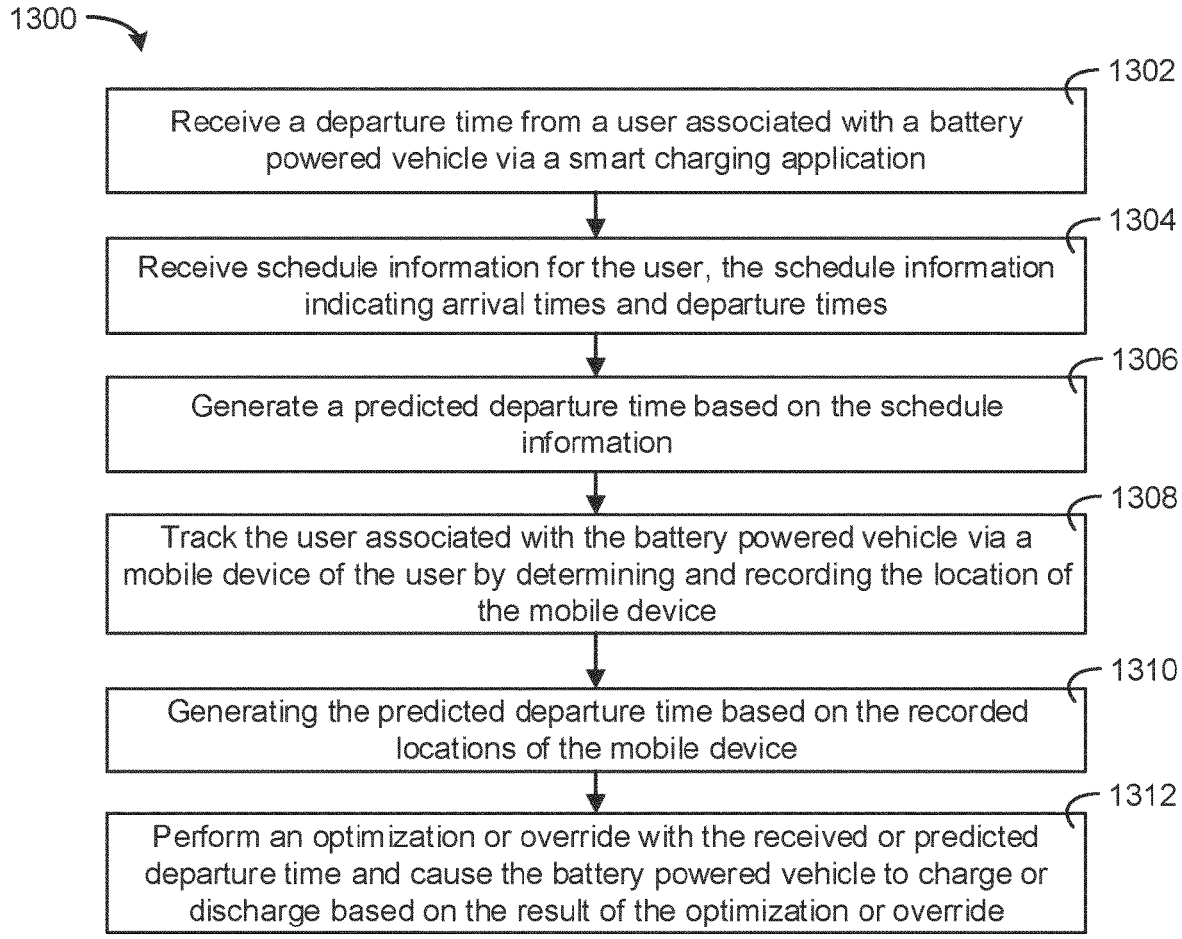
FIG. 13 is a flow diagram of a process for receiving or determining a departure time of a user and using the departure time to perform the charging or discharging optimization, according to an exemplary embodiment.

Referring now to FIG. 13, a process 1300 is shown for performing an optimization based on a received or predicted departure time is shown, according to an exemplary embodiment. The controller 506 can be configured to perform the process 1300. Similarly, the vehicle charging system 1000 can be configured to perform the process 1300. Furthermore, any computing device described herein can be configured to perform the process 1300. However, the process 1300 is described with reference to the controller 506.

In step 1302, the vehicle charge optimizer 1100 can receive a departure time from the user 1006 associated with the battery powered vehicle 1002 via a user interface. In some embodiments, the departure time is received from the charging application 1018 of the mobile device 1008. In some embodiments, the departure time is received from the user interface 1112 of the vehicle charging system 1000.

In step 1304, the user schedule manager 1108 can receive schedule information for the user. The schedule information may be received directly from a schedule application of the mobile device 1008. In some embodiments, the schedule information is received from a server hosting a schedule account for the user 1006. In step 1306, the user schedule manager 1108 can generate a prediction of a departure time and provide the predicted departure time to the vehicle charge optimizer 1100. In some embodiments, based on meeting or scheduled events, and in particular based on the location for the event and a start time of the event, the schedule manager 1108 can generate the predicted departure time.

In step 1308, the occupant tracker 1110 can determine the location of the mobile device 1008 and record the location of the mobile device 1008 over time. The occupant tracker 1110 can receive a location of the mobile device 1008 from a GPS system of the charging application 1018. In some embodiments, the occupant tracker 1110 can determine the location of the mobile device 1008 based on communication between the mobile device 1008 and one or more routers or wireless emitters located within the building 116. The occupant tracker 1110 can record the determined and/or received locations of the occupant tracker 1110 over time.

In step 1310, the occupant tracker 1110 can generate the predicted departure based on the recorded locations of the mobile device 1008. In some embodiments, the occupant tracker 1110 can determine that, based on a trend of the recorded locations, the mobile device 1008 is returning to the battery powered vehicle 1002. In this regard, the predicted departure time can be generated based on the trend of the recorded locations.

In step 1312, the vehicle charge optimizer 1100 can perform an optimization or override with the optimizer 1104 and the user entered departure time and the predicted departure time. The result of the optimization may indicate the times to charge and/or discharge the battery 1114 of the battery powered vehicle 1002 and the appropriate rates at which to charge or discharge. Furthermore, the vehicle charge optimizer 1100 may override any current charge and/or discharge optimization. For example, if the predicted departure time indicates that a user is likely to depart in the next ten minutes or a user manually indicates that they need to depart sooner than their entered departure time, the vehicle charge optimizer 1100 can override the optimization and charge the battery 1114 of the battery powered vehicle 1002 at a maximum acceptable rate.

In some embodiments, the process 1300 can be performed dynamically. If user-specified or predicted charging information change, the optimization of process 1300 may no longer be appropriate for charging the battery 1114. In this regard, the vehicle charge optimizer 1100 can be configured to perform the process 1300 dynamically, e.g., whenever performing the process 1300 is required to optimize the charging and/or discharging of the battery 1114. If the user-specified charging information (e.g., departure time, charging program, etc.) changes, the vehicle charge optimizer 1100 can be configured to generate new charging constraints 1102 to account for the changes and perform the optimization a second time. Performing the optimization a second time may include performing an optimization over an optimization between the current time and the departure time.

As an example, if the user 1006 specifies a particular departure time, the vehicle charge optimizer 1100 can perform an optimization to optimally charge and/or discharge the battery 1114 over a time horizon (e.g., from a starting charge time to the departure time). However, based on the occupant tracker 1110 and/or the user schedule manager 1108, the predicted departure time can be generated. This predicted departure time may be earlier and/or sooner than the user-specified departure time. In response to the predicted departure time being different than the user-specified departure time, the vehicle charge optimizer 1100 can generate new charging constraints 1102 for the predicted departure time, perform the optimization with the new charging constraints 1102, and charge and/or discharge the battery 1114 based on the new optimization. The new optimization may generate a set of charging or discharging decisions (e.g., a charging or discharging decision for each time step of the optimization window) limited by the new charging constraints 1102. A similar dynamic optimization can be performed if the user manually adjusts the user-specified departure time.

Figure 14:
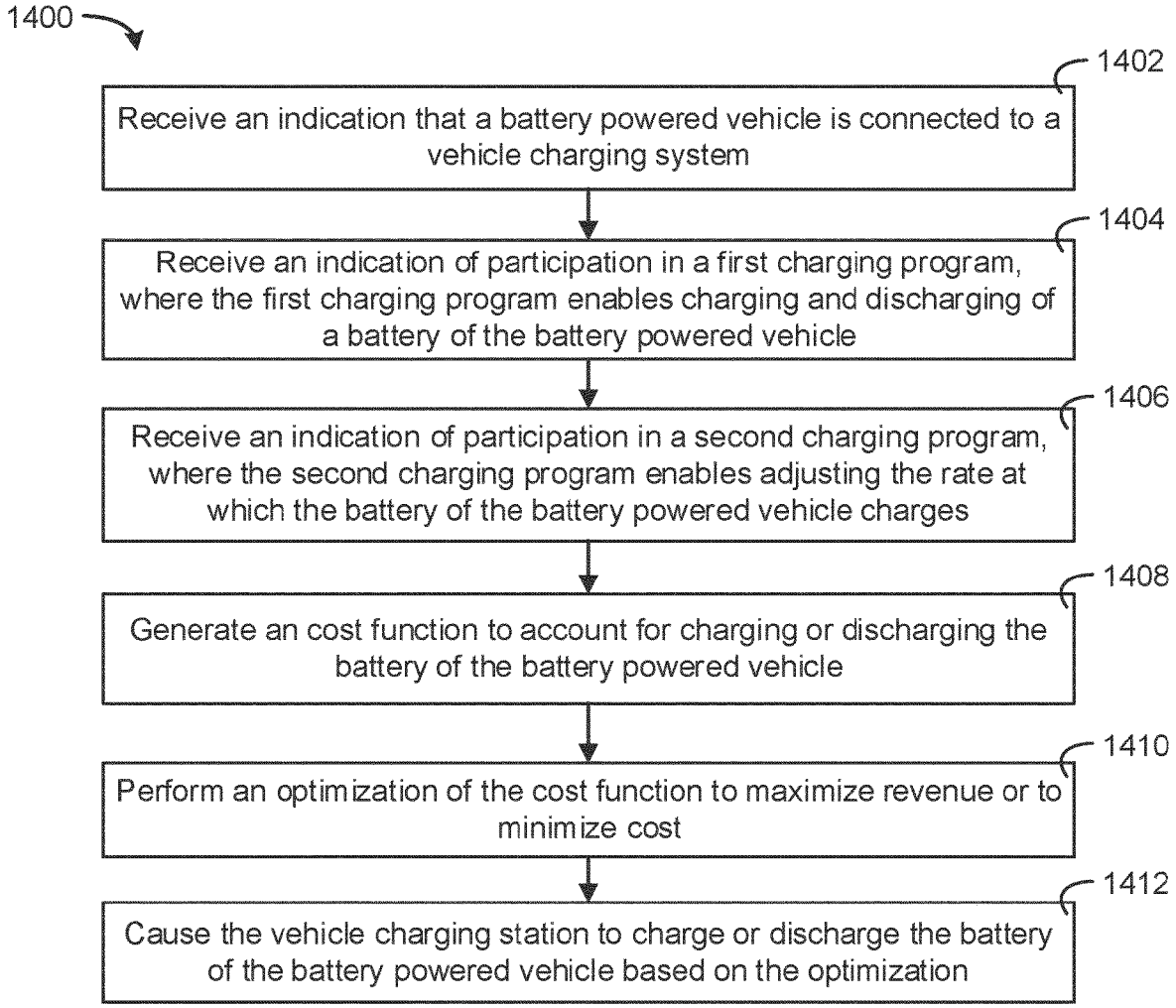
FIG. 14 is a flow diagram of a process for receiving a selection of a charging program by a user and performing an optimization to charge or discharge the battery powered vehicle of FIG. 10 based on the selection of the user, according to an exemplary embodiment.

Referring now to FIG. 14, a process 1400 is shown for selecting a particular charging program and performing an optimization with the selected charging program, according to an exemplary embodiment. The controller 506 can be configured to perform the process 1400. Similarly, the vehicle charging system 1000 can be configured to perform the process 1400. Furthermore, any computing device described herein can be configured to perform the process 1400. However, the process 1400 is described with reference to the controller 506.

In step 1402, the battery powered vehicle 1002 may be connected to charge with the vehicle charging system 1000. The vehicle charging system 1000 may provide an indication that the battery powered vehicle 1002 is connected to the vehicle charging system 1000 to the vehicle charge optimizer 1100. The presence or absence of the battery powered vehicle 1002 may be realized in the optimization as a charging constraint 1102, i.e., the optimizer 1104 only considers charging or discharging the battery 1114 of the battery powered vehicle 1002 if the vehicle is present.

In step 1404, the vehicle charge optimizer 1100 may receive an indication of selection by the user 1006 of a first charging program where the first charging program is to charge and discharge the battery 1114 of the battery powered vehicle 1002. The selection of the first charging program may be received from the charging application 1018 and/or the user interface 1112. In some embodiments, the program is to charge and discharge the battery 1114 such that the battery 1114 is charged to a predefined amount at a particular departure time. The first charging program may be a set of charging constraints 1102 that enable the optimizer 1104 to set times and rates for the battery 1114 to charge and/or discharge.

In step 1406, the vehicle charge optimizer 1100 may receive an indication of selection by the user 1006 of a second charging program where the second charging program is to charge the battery 1114 of the battery powered vehicle 1002 at varying rates. The selection of the second charging program may be received from the charging application 1018 and/or the user interface 1112. The second charging program may be to charge the battery powered vehicle 1002 at varying rates over time to achieve a particular charge level at a particular departure time. The second charging program may not allow the battery 1114 to ever discharge. The second charging program may be realized in the optimization as a set of charging constraints 1102 that prevent the battery 1114 from discharging but allow the rate at which the battery powered vehicle 1002 to vary such that the battery 1114 is charged to a predefined amount by a departure time.

In step 1408, the optimizer 1104 can generate a cost function which accounts for charging and/or discharging the battery 1114. Cost function may include the rates at which the battery powered vehicle 1102, other battery powered vehicles, and/or the building equipment 1116 consume energy. In step 1410, the optimizer 1104 can optimize the cost function to optimally charge or discharge the battery 1114 of the battery powered vehicle 1002. The result of the optimization may be one or more charging or discharging rates for time steps of an optimization window (a predefined amount of time into the future). In step 1412, the vehicle charge optimizer 1100 can cause the vehicle charging system 1000 to charge the battery 1114 of the battery powered vehicle 1002 based on the optimization, e.g., the charging or discharging rates for the time steps of the optimization window.

Figure 15:
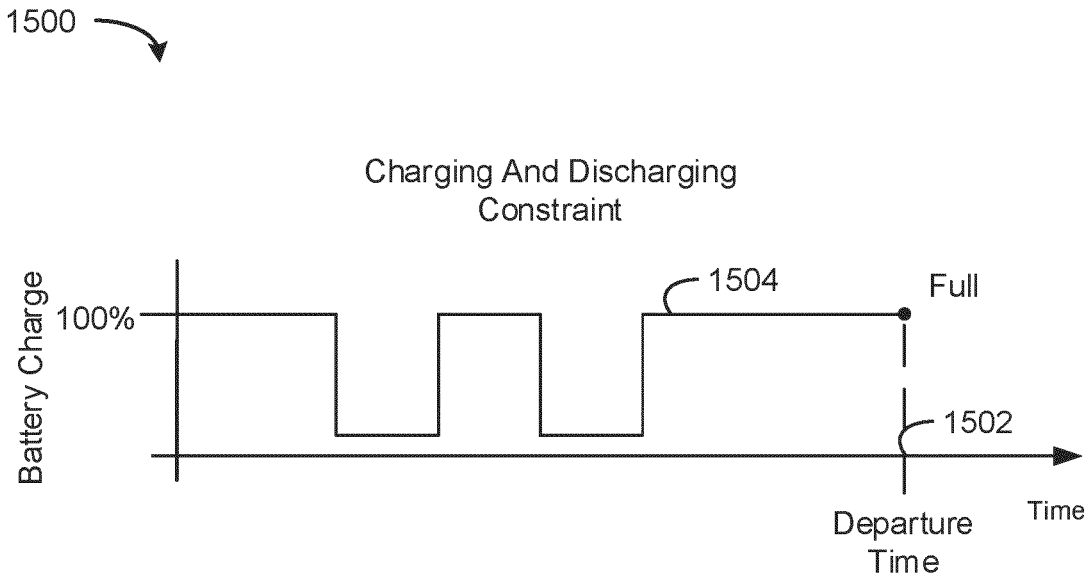
FIG. 15 is a chart indicating charging and discharging the battery of the battery powered vehicle of FIG. 10 with a first charging program which allows the controller of FIG. 11 to both charge and discharge the battery of the battery powered vehicle of FIG. 10, according to an exemplary embodiment.

Referring now to FIG. 15, a graph 1500 illustrating the battery charge of the battery 1114 when the battery 1114 is charged or discharged according to the first charging program of step 1404 of the process 1400 of FIG. 14 is shown, according to an exemplary embodiment. In FIG. 15, the charge over time of the battery 1114 is shown by marker 1504. As can be seen in FIG. 15, the battery charge rises and falls overtime. This may be indicative of the optimization to charge and/or discharge the battery 1114 according to the first charging program in which the state-of-charge of the battery 1114 is allowed to increase and/or decrease over the duration of the optimization window. Furthermore, at the departure time 1502, the battery 1114 is fully charged. This may be implemented by a constraint that defines the state-of-charge of the battery 1114 is 100% at a specific time step concurrent with the departure time.

Figure 16:
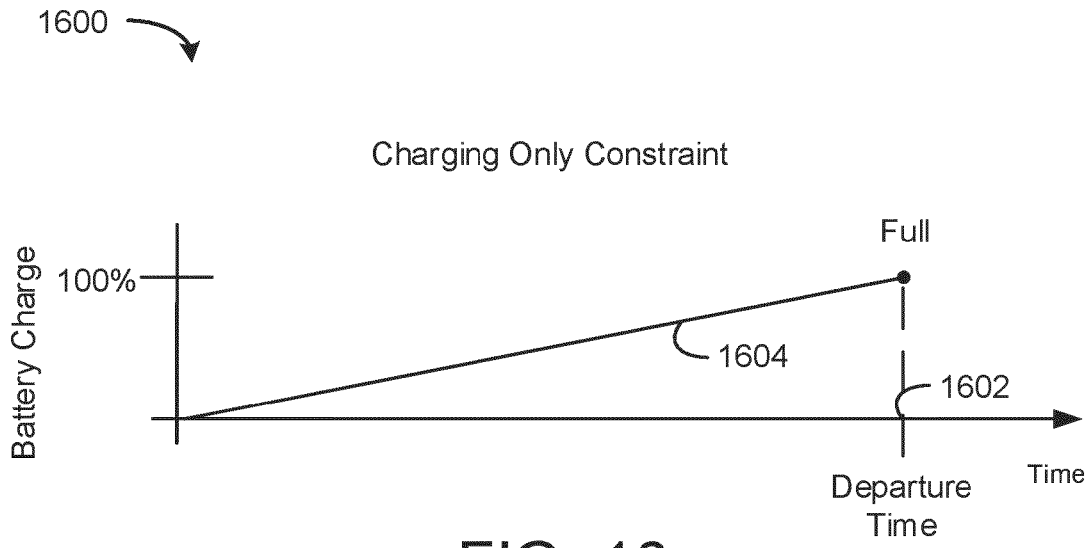
FIG. 16 is a chart indicating a second charging program that allows the controller of FIG. 11 to only charge the battery of the battery powered vehicle of FIG. 10, according to an exemplary embodiment.

Referring now to FIG. 16, a graph 1600 is shown illustrating the battery charge of the battery 1114 when the battery 1114 is charged according to the second charging program of the step 1406 of the process 1400 of FIG. 14, according to an exemplary embodiment. In FIG. 16, the charge over time of the battery 1114 is shown by marker 1604. As can be seen in FIG. 16, the battery charge only rises and never falls over time. This may be indicative of the optimization to only charge the battery 1114 according to the second charging program in which the state-of-charge of the battery 1114 is prevented from decreasing by imposing charging constraints. While the rate at which the battery 1114 may vary over the charging window, the battery 1114 never discharges. Furthermore, at the departure time 1602, the battery 1114 is fully charged.

Figure 17:
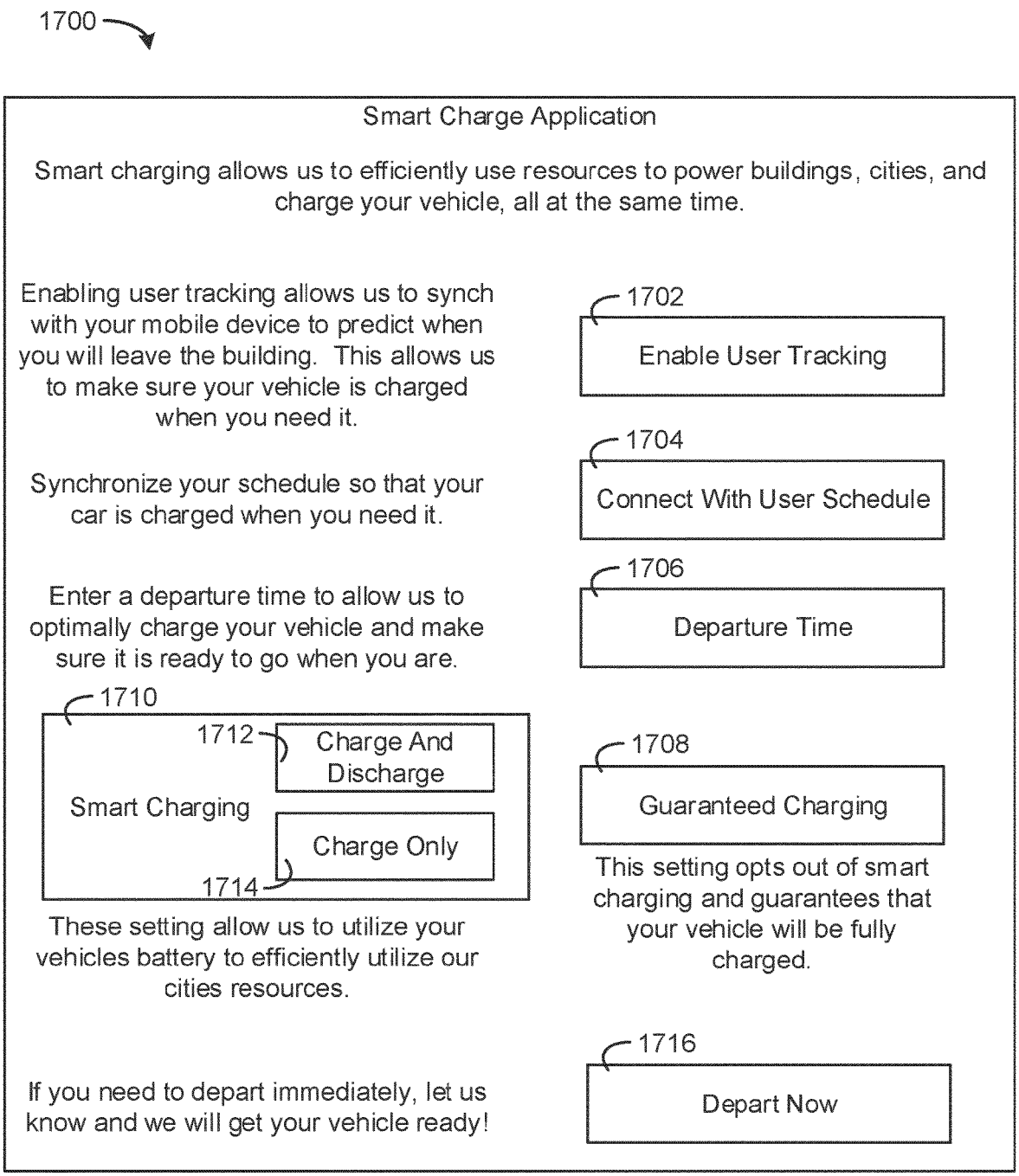
FIG. 17 is a user interface that allows a user to select charging constraints of the vehicle of FIG. 10, according to an exemplary embodiment.

Referring now to FIG. 17, a user interface 1700 for selecting the charging program and entering the departure time is shown, according to an exemplary embodiment. The interface 1700 can be generated by the vehicle charging system 1000 and displayed via the user interface 1112. In some embodiments, the user interface 1700 is generated by the charging application 1018 of the mobile device 1008. The information entered into the user interface 1700 by the user 1006 may be communicated by either the vehicle charging system 1000 and/or the mobile device 1008 to the controller 506.

The user interface 1700 is shown to include various settings and inputs. The user interface 1700 is shown to include an enable user tracking button 1702. Enabling user tracking via the enable user tracking button 1702 may enable the occupant tracker 1110 to determine the location of the user 1006, track the location of the user 1006, and generate a predicted departure time.

Furthermore, the user interface 1700 is shown to include a connect with use schedule button 1704. By interacting with the button 1704, the user may synchronize a user schedule of the user 1006 and provide schedule data to the user schedule manager 1108. Based on the schedule data received from either the mobile device 1008 or a remote server, the user schedule manager 1108 can generate the predicted departure time.

Departure time 1706 may be an interactive interface object of the interface 1700 that allows a user to enter a departure time. Furthermore, the user 1006 can enter a desired battery charge amount at the departure time. For example, the user 1006 may enter information indicative of charging the battery 1114 to 80% at 10 A.M. on Friday Jan. 1, 2016. Shown in FIG. 17, the user interface 1700 includes a guaranteed charging 1708 button. Selection of this option may override any kind of optimization and guarantee that the battery 1114 only charges and charges at the maximum charging rate.

The interface 1700 is shown to include a smart charging interactive object 1710 which allows a user to select between two different charging programs, charge and discharge 1712 and charge only 1714. The two charging programs may be mutually exclusive and the user 1006 may only be allowed to select one of the two charging programs. Charge and discharge 1712 may be the first charge program where the optimizer 1104 can charge and/or discharge the battery 1114 of the battery powered vehicle 1002 at varying rates. The charge only 1714 option may allow the battery 1114 of the battery powered vehicle 1002 to only charge and never discharge (the second charge program). The charge only program may allow for the battery 1114 to charge at varying rates but never discharge.

Depart now button 1716 of the interface 1700 may enable a user to override any optimization program running to charge and/or discharge the battery 1114 of the battery powered vehicle 1002. Selection of the depart now button 1716 may cause the battery 1114 of the battery powered vehicle 1002 to charge at a maximum rate. In some embodiments, the interface 1700 notifies the user when the vehicle is ready to be driven (has reached a predefined charge level).

Referring generally to the interface 1700, the interface 1700 can be configured to facilitate payment for vehicle charging. Some modes of charging may cost varying amounts of money while some modes of charging the battery powered vehicle 1002 may be free. In this regard, payment for charging the battery powered vehicle 1002 may be tiered. For example, the option, charge and discharge 1712 may be free while the option charge only 1714 may cost a second rate. Furthermore, the option guaranteed charging 1708 may cost a third rate greater than the second rate. In this regard, a user may be able to best select a charging program that suites them, i.e., whether they want to pay for charging, and what type of smart charging, if any, that they would like to participate in. For example, if a user is aware that they need to charge their vehicle quickly since they will soon travel, they may pay the greatest rate and select guaranteed charging 1708.

In some embodiments, or at particular times of the day, participation in smart charging may generate funds for a user instead of costing money. In this regard, a user may be incentivized to provide the battery of their vehicle to the controller 506 for participation in various charging and discharging programs offered by the controller 506.

Battery Powered Vehicle Cost Optimization Example

The systems and methods discussed herein can address Mobile Storage Optimization for variable pricing scenarios. This can be described as a classical Model Predictive Control optimization over a horizon problem with Deep Learning driven prediction to constraint the optimization problem. The systems and methods described herein can use optimization technology for mobile storage systems. The optimization algorithms can take in to account different grid pricing scenarios and also facilitate PV, CoGen, Thermal Energy Storage, Stationary Electrical Storage, Local Parking Storage, Building Mass Storage and other equipment considerations. The terms used herein may be represented by acronyms, EOS may represent Enterprise Optimization Solution, LPSS may represent Local Parking Stationary Storage, PV may represent Photovoltaic, TES may represent Thermal Energy Storage, MPC may represent Model Predictive Control, while SI may represent System Identification.

The problem addressed by the systems and methods discussed herein may answer the question to how best utilize mobile storage in campus operations in the presence of a time varying cost structure for grid energy. Campus central plants have many different types of equipment to provide services to buildings on campus. In addition, buildings have some capacity to self-serve if they use stand-alone equipment. Some of the types of functions are Photovoltaic, GoGeneration, Thermal Energy Storage, Stationary Electrical Storage, Local Parking Ramp Stationary Storage. The optimization problem can be one of mathematically computing the best economic dispatch of these resources given constraints and services that need to be provided to occupied spaces. In the presence of variable pricing this optimization problem can present a formidable challenge. The deterministic optimization problem can include mixed integer linear programming in combination with local quadratic programming for minimizing the energy of the final equipment allocation.

The optimization problem can be stated as finding the zone temperature setpoint trajectories for buildings and binary allocation of equipment with KW charging setpoints that will minimize the cost, $$\min(J) = \sum_{i=1}^{NH} C_i P_i \Delta t_i + \sum_{j=1}^{M} C_j \max_{Rj}(P_j) - \sum_{i=1}^{NH} C_i U_i \Delta t_i + \sum_{i=1}^{NH} C_j M_i \Delta t_i$$

In this objective function there can be four major components. The first component can be the power taken off of the grid utility provider at variable cost. The second component can be the peak demand charge for that imported grid energy taken from the grid. The third component can be incentive based programs that pay money to participate and shape your electrical load. The last component can be mobile storage revenues from on campus customers utilizing the energy charging capabilities of the campus.

Figure 18:
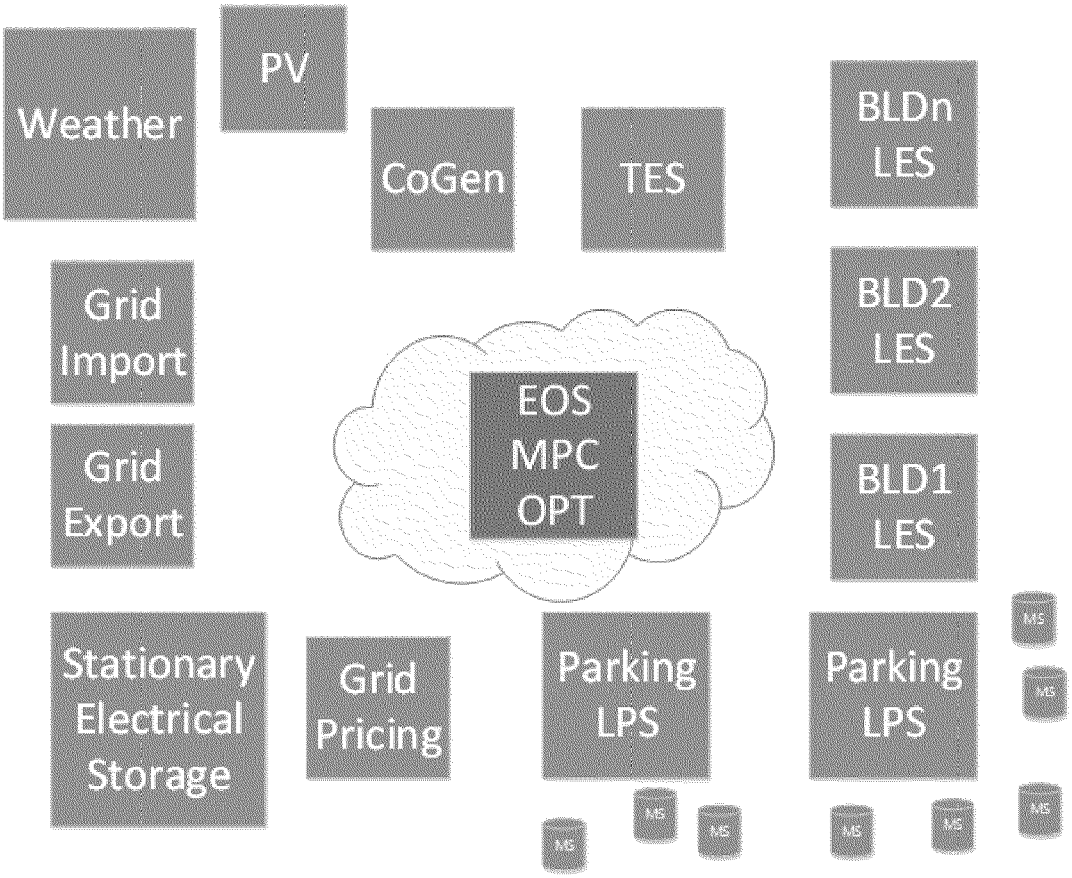
FIG. 18 is a block diagram of an optimization system for optimizing the charging and/or discharging of the vehicle of FIG. 10, according to an exemplary embodiment.

The cost function can be subject to equality constraints, $Q_{CHW}=Q_{CLoad}\pm QC_{TES}$ Cold Water Loads $Q_{HW}=Q_{HLoad}\pm Q_{HTES}$ Hot Water and Steam Loads $Q_{ELECcampus}=Q_{ELoad}\pm Q_{StationaryELEC}\pm_{QMobileELEC}-Q_{Generation}\pm Q_{Grid}$ Electric Loads The equality constraints can be driven by the services provided to the campus in the form of cold and hot loads and electrical loads. The cost function can also subject to inequality constraints, $Q_{min}<Q_{Equip}<Q_{max}$ Equipment Capacities and Minimum turn downs $T_{min}<T_z<T_{max}$ Building Temperature Setpoints $T_{min}<T_E<T_{max}$ Equipment Temperature Setpoints $KWh_{min}<KWh_E<KWh_{max}$ Charging Rate Setpoints Referring now to FIG. 18, a block diagram is shown for optimizing the charging and/or discharging of batteries of vehicles, according to an exemplary embodiment. FIG. 18 shows the elements that may exist in an optimization at the enterprise level. In FIG. 18, TES may be Thermal Energy Storage, LES may be Local Equipment Storage, LPS may be Local Parking Storage, and MS may be Mobile Storage.

Mobile storage can present a unique set of constraints to the MPC optimization problem. The following is a list of constraints that can be considered. Can we charge and discharge the mobile battery during a time period, what is the minimum charge level? What is the allowed charge and discharge rate of the mobile battery? What is the charge to desired level? What time is the charge expected to be at the desired level? What minimum anytime charge level is expected? How much are you willing to pay for the electrical charge? What is the Optimal charge cost to ensure the probability 90% that the mobile storage will come to your space? How do we maximize revenue given the mobile storage devices have other options locally for charging?

Figure 19:
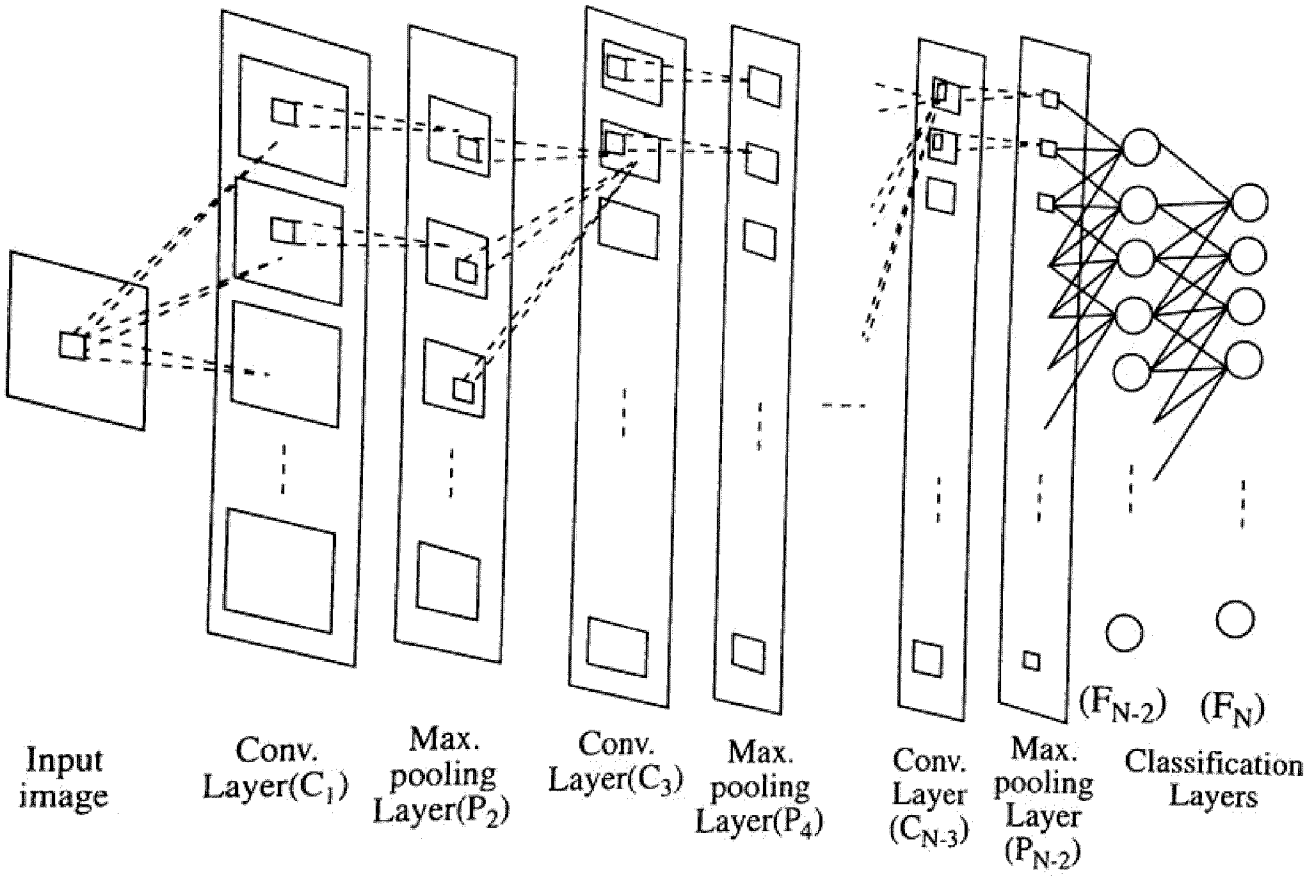
FIG. 19 is a block diagram of a convolutional neural network (CNN) for predicting the amount of mobile storage available in the future, according to an exemplary embodiment.

Referring now to FIG. 19, a convolutional neural network (CNN) is shown for predicting an available amount of mobile storage, according to an exemplary embodiment. Central to the optimization problem may be predicting the amount of mobile storage available every hour for the next 7 days. This problem can be cast as a Neural Network problem of pattern matching.

Realization of the algorithm to predict mobile storage hourly for a facility can be done doing a common convolutional neural network. The stages to the CNN may be: 1, an input layer consisting of each node is a parking structure, 2, a Convolutional Layer 1 with each node representing one mobile storage unit over the horizon, 3, Convolutional Layer 2 with each node representing the features of interest over the horizon, 4, Convolutional Layer 3 with each node representing interactions with Local Parking Storage over the horizon, 5, Classification Layer for identifying the number of mobile storage units per parking structure over the horizon, and 6. Output Layer giving mobile storage amount and locations over the horizon.

The Deep Learning algorithm can adapt over time to account for correlations with weather, seasonal changes, schedules for facilities, movements of mobile storage in the community. Included may be growth predictions for the number of mobile units, efficiency changes in technology, incentive based programs to facilitate a more stable grid operation. The reinforced learning approach can operate over the horizon to bring necessary mobile storage prediction to the MPC optimization algorithm.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building optimization system for charging and discharging a battery of a battery powered vehicle comprising:

a charging system configured to cause the battery of the battery powered vehicle to charge or discharge;

an optimization controller comprising a processing circuit configured to:

receive one or more charging constraints for the battery powered vehicle;

determine whether to charge or discharge the battery of the battery powered vehicle by performing an optimization with the one or more charging constraints; [and]

cause the charging system to charge or discharge the battery of the battery powered vehicle to a particular charge level at a predicted departure time based on the optimization*; and*

*cause the charging system to override the optimization and begin charging the battery of the battery powered vehicle at a maximum acceptable rate in response to a user input indicating an actual departure time sooner than the predicted departure time.*

2. The system of claim 1, wherein the one or more charging constraints comprise the predicted departure time and the particular charge level for the departure time.

3. The system of claim 1, wherein the *one or more* charging constraints comprise a first charging program, wherein the first charging program is to charge and discharge the battery and charge the battery to the particular charge level at the predicted departure time.

4. The system of claim 1, wherein the *one or more* charging constraints comprise a second charging program, wherein the second charging program is to charge the battery at a plurality of different charging rates and charge the battery to the particular charge level at the predicted departure time, wherein the second charging program does not allow for the battery to discharge.

5. The system of claim 1, wherein the processing circuit is configured to generate the predicted departure time by:

receiving one or more schedule events of a schedule associated with a user from at least one of a mobile device associated with the user and a server configured to store the schedule associated with the user; and generating the predicted departure time based on the one or more schedule events.

6. The system of claim 1, wherein the processing circuit is configured to generate the predicted departure time by:

communicating via a wireless network with a mobile device associated with a user;

determine a location of the mobile device associated with the user based on the communication via the wireless network with the mobile device;

log the location and a plurality of other previous locations of the mobile device in a location log; and generate the predicted departure time based on a pattern of locations of the mobile device based on the plurality of locations of the location log.

7. The system of claim 5 or claim 6, wherein the processing circuit configured to generate the predicted departure time causes the optimization to determine whether to charge or discharge the battery of the battery powered vehicle so that a charge level of the battery of the battery powered vehicle is the particular charge level at the predicted departure time.

8. The system of claim 1, wherein the processing circuit is configured to determine whether to charge or discharge the battery of the battery powered vehicle by performing [an] *the* optimization with the one or more charging constraints by:

generating a cost function, wherein the cost function accounts for cost and revenue generated from purchasing energy from an energy grid to charge the battery of the battery powered vehicle and revenue generated from discharging the battery of the battery powered vehicle to power a plurality of building equipment or provide power to the energy grid;

optimize the cost function to determine whether to charge or discharge the battery of the battery powered vehicle at one or more time steps of an optimization window; and cause the charging system to charge or discharge the battery of the battery powered vehicle based on the optimization by [causing the charging system to charge or discharge] *charging or discharging* the battery of the battery powered vehicle at the one or more time steps of the optimization window.

9. A building optimization system for charging and discharging a battery of a battery powered mobile device comprising:

a charging system configured to cause the battery of the battery powered mobile device to (*i*) charge or discharge *or* (*ii*) *charge and not discharge*;

an optimization controller comprising a processing circuit configured to:

receive one or more charging constraints for the battery powered mobile device;

determine whether to (*i*) charge or discharge the battery of the battery powered mobile device *or* (*ii*) *charge and not discharge the battery of the battery powered mobile device,* by performing an optimization with the one or more charging constraints;

generate a predicted departure time by [at least one of:

receiving one or more schedule events of a schedule associated with a user from at least one of a mobile device associated with the user or a server configured to store the schedule associated with the user and generating the predicted departure time based on the one or more schedule events; or]

(*i*) tracking a plurality of locations of [the] *a second* mobile device [associated with] *carried by* the user based on wireless communication with the *second* mobile device *as the user and the second mobile device approach the battery powered mobile device* and (*ii*) generating the predicted departure time based on a pattern of the plurality of locations of the *second* mobile device *indicating a predicted time at which the user and the second mobile device will arrive at the battery powered mobile device*; and cause the charging system to (*i*) charge or discharge the battery of the battery powered mobile device *or* (*ii*) *charge and not discharge the battery of the battery powered mobile device,* based on the optimization.

10. The system of claim 9 wherein the one or more charging constraints comprise a particular charge level for the predicted departure time;

wherein the processing circuit is configured to cause the charging system to (*i*) charge or discharge the battery of the battery powered mobile device *or* (*ii*) *charge and not discharge the battery of the battery powered mobile device,* such that a battery charge level of the battery of the battery powered mobile device is at the particular charge level at the predicted departure time.

11. The system of claim 10, wherein the *one or more* charging constraints comprise a first charging program, wherein the first charging program is to charge and discharge the battery and charge the battery to a predefined amount at the predicted departure time.

12. The system of claim 10, wherein the *one or more* charging constraints comprise a second charging program, wherein the second charging program is to charge the battery at a plurality of different charging rates and charge the battery to a predefined amount at the predicted departure time, wherein the second charging program does not allow for the battery to discharge.

13. The system of claim 9, wherein the processing circuit is configured to determine whether to charge or discharge the battery of the battery powered mobile device by performing [an] *the* optimization with the one or more charging constraints by:

generating a cost function, wherein the cost function accounts for cost and revenue generated from purchasing energy from an energy grid to charge the battery powered mobile device and revenue generated from discharging the battery of the battery powered mobile device to power a plurality of building equipment or provide power to the energy grid; and optimize the cost function to determine whether to charge or discharge the battery of the battery powered mobile device at one or more time steps of an optimization window; and wherein the processing circuit is configured to cause the charging system to charge or discharge the battery of the battery powered mobile device based on the optimization by [causing the charging system to charge or discharge] *charging or discharging* the battery of the battery powered [vehicle] *mobile device* at the one or more time steps of the optimization window.

14. A method for optimizing a building energy system comprising:

connecting a battery of a [battery-powered] *battery powered* device to a charging system, the charging system coupled with a building electrical grid;

*presenting an interactive user interface that allows a user to select between (i) a first charging program that allows the battery to be both charged and discharged by the charging system and (ii) a second charging program that allows the battery to be charged by the charging system and prevents the battery from being discharged by the charging system;*

*receiving an indication of selection by the user of either the first charging program or the second charging program;*

[receiving] *generating* one or more charging constraints for [a] *the* battery powered device *based on whether the user selects the first charging program or the second charging program via the user interface*; [and]

performing an optimization with the one or more charging constraints[; and determining whether] *to determine one or more times at which* to (*i*) charge or discharge the battery of the battery powered device *if the user selects the first charging program or (ii) charge the battery of the battery powered device if the user selects the second charging program*; and

[causing] *operating* the charging system *at the one or more times* to (*i*) charge or discharge the battery of the battery powered device to a predetermined charge level at a predicted departure time based on the optimization *if the user selects the first charging program or (ii) charge the battery of the battery powered device to the predetermined charge level at the predicted departure time based on the optimization if the user selects the second charging program.*

15. The method of claim 14, wherein [receiving] *generating the* one or more charging constraints further comprises receiving the predicted departure time and the predetermined charge level for the predicted departure time.

16. The method of claim 14, wherein [receiving one or more charging constraints further comprises selecting a] *the indication of selection indicates that the user has selected the* first charging program, wherein the first charging program comprises charging and discharging the battery of the battery powered device and charging the battery of the battery powered device to the predetermined charge level at the predicted departure time.

17. The method of claim 14, wherein [receiving one or more charging constraints further comprises selecting a] *the indication of selection indicates that the user has selected the* second charging program, wherein the second charging program comprises charging the battery of the battery powered device at a plurality of different charging rates and charging the battery of the battery powered device to the predetermined charge level at the predicted departure time, wherein the second charging program does not include discharging the battery of the battery powered device.

18. The method of claim 14, [wherein determining whether to charge or discharge the battery of the battery powered device] further [comprises] *comprising* generating the predicted departure time by:

receiving one or more schedule events of a schedule associated with a user from at least one of a mobile device associated with the user and a server configured to store the schedule associated with the user; and generating the predicted departure time based on the one or more schedule events.

19. The method of claim 14, wherein receiving one or more charging constraints further comprises receiving the predicted departure time, wherein receiving a predicted departure time involves determining whether to (*i*) charge or discharge the battery of the battery powered device *if the user selects the first charging program or (ii) charge the battery of the battery powered device if the user selects the second charging program,* so that a charge level of the battery of the battery powered device is at the predetermined charge level at the predicted departure time.

20. The method of claim 14, wherein *the indication of selection indicates that the user has selected the first charging program and* performing [an] *the* optimization further comprises:

generating a cost function, wherein the cost function accounts for cost and revenue generated from purchasing energy from an energy grid to charge the battery of the battery powered device and revenue generated from discharging the battery of the battery powered device to power building equipment or provide power to the energy grid; and optimizing the cost function to determine whether to charge or discharge the battery of the battery powered device at one or more time steps of an optimization window; and causing the charging system to charge or discharge the battery of the battery powered device at the one or more time steps of the optimization window.

*21. A controller for charging or discharging a battery of a battery powered vehicle, the controller comprising:*

*a processing circuit configured to:*

*receive one or more charging constraints;*

*determine whether to charge or discharge the battery of the battery powered vehicle by performing a control process with the one or more charging constraints;*

*cause a charging system to charge or discharge the battery of the battery powered vehicle to a particular charge level at a predicted departure time based on the control process; and*

*cause the charging system to override the control process and begin charging the battery of the battery powered vehicle at a maximum acceptable rate in response to a user input indicating an actual departure time sooner than the predicted departure time.*

*22. The controller of claim 21, wherein the one or more charging constraints comprise the predicted departure time and the particular charge level at the predicted departure time, wherein the predicted departure time comprises input from a user.*

*23. The controller of claim 21, wherein the charging constraints comprise a first charging program, wherein the first charging program is to charge and discharge the battery and charge the battery to the particular charge level at the predicted departure time.*

*24. The controller of claim 21, wherein the charging constraints comprise a second charging program, wherein the second charging program is to charge the battery at a plurality of different charging rates and charge the battery to the particular charge level at the predicted departure time, wherein the second charging program does not allow for the battery to discharge.*

*25. The controller of claim 21, wherein the processing circuit is configured to generate the predicted departure time by:*

*receiving one or more schedule events of a schedule associated with a user from at least one of a mobile device associated with the user and a server configured to store the schedule associated with the user; and*

*generating the predicted departure time based on the one or more schedule events.*

*26. The controller of claim 21, wherein the processing circuit is configured to generate the predicted departure time by:*

*communicating via a wireless network with a mobile device associated with a user;*

*determining a location of the mobile device associated with the user based on the communication via the wireless network with the mobile device;*

*logging the location and a plurality of other previous locations of the mobile device in a location log; and*

*generating the predicted departure time based on a pattern of locations of the mobile device based on the plurality of locations of the location log.*

*27. The controller of claim 21, wherein the processing circuit configured to cause the charging system to charge or discharge the battery of the battery powered vehicle so that a charge level of the battery of the battery powered vehicle is the particular charge level at the predicted departure time.*

*28. The controller of claim 21, wherein the processing circuit is configured to determine whether to charge or discharge the battery of the battery powered vehicle by performing an optimization with the one or more charging constraints.*

*29. A controller for charging or discharging a battery of a battery powered mobile device, the controller comprising:*

*a processing circuit configured to:*

*receive one or more charging constraints;*

*determine whether to (i) charge or discharge the battery of the battery powered mobile device or (ii) charge and not discharge the battery of the battery powered mobile device, by performing a control process with the one or more charging constraints;*

*generate a predicted departure time by (i) tracking a plurality of locations of a second mobile device carried by the user based on wireless communication with the second mobile device as the user and the second mobile device approach the battery powered mobile device and (ii) generating the predicted departure time based on a pattern of the plurality of locations of the second mobile device indicating a predicted time at which the user and the second mobile device will arrive at the battery powered mobile device; and*

*cause a charging system to (i) charge or discharge the battery of the battery powered mobile device or (ii) charge and not discharge the battery of the battery powered mobile device, based on the control process.*

*30. The controller of claim 29 wherein the one or more charging constraints comprise a particular charge level for the predicted departure time;*

*wherein the processing circuit is configured to cause the charging system to (i) charge or discharge the battery of the battery powered mobile device or (ii) charge and not discharge the battery of the battery powered mobile device, such that a battery charge level of the battery of the battery powered mobile device is at the particular charge level at the predicted departure time.*

*31. The controller of claim 29, wherein the charging constraints comprise a first charging program, wherein the first charging program is to charge and discharge the battery and charge the battery to a predefined amount at the predicted departure time.*

*32. The controller of claim 29, wherein the charging constraints comprise a second charging program, wherein the second charging program is to charge the battery at a plurality of different charging rates and charge the battery to a predefined amount at the predicted departure time, wherein the second charging program does not allow for the battery to discharge.*

*33. The controller of claim 29, wherein the processing circuit is configured to determine whether to charge or discharge the battery of the battery powered mobile device by performing an optimization with the one or more charging constraints.*

*34. A method for charging or discharging a battery powered device comprising:*

*presenting an interactive user interface that allows a user to select between (i) a first charging program that allows the battery to be both charged and discharged and (ii) a second charging program that allows the battery to be charged and prevents the battery from being discharged;*

*receiving an indication of selection by the user of either the first charging program or the second charging program;*

*generating one or more charging constraints based on whether the user selects the first charging program or the second charging program via the user interface;*

*performing a control process with the one or more charging constraints to determine one or more times at which to (i) charge or discharge the battery of the battery powered device if the user selects the first charging program or (ii) charge the battery of the battery powered device if the user selects the second charging program; and*

*operating a charging system at the one or more times to (i) charge or discharge the battery of the battery powered device to a predetermined charge level at a predicted departure time based on the control process if the user selects the first charging program or (ii) charge the battery of the battery powered device to the predetermined charge level at the predicted departure time based on the control process if the user selects the second charging program.*

*35. The method of claim 34, wherein generating the one or more charging constraints further comprises receiving the predicted departure time and the predetermined charge level at the predicted departure time, wherein the predicted departure time is based on a user-specified departure time and the battery powered device comprises at least one of an electric vehicle or a device having an electric motor.*

*36. The method of claim 34, wherein the indication of selection indicates that the user has selected the first charging program, wherein the first charging program comprises charging and discharging the battery of the battery powered*

*device and charging the battery of the battery powered device to the predetermined charge level at the predicted departure time.*

*37. The method of claim 34, wherein the indication of selection indicates that the user has selected the second charging program, wherein the second charging program comprises charging the battery of the battery powered device at a plurality of different charging rates and charging the battery of the battery powered device to the predetermined charge level at the predicted departure time, wherein the second charging program does not include discharging the battery of the battery powered device.*

*38. The method of claim 34, further comprising generating the predicted departure time by:*

*receiving one or more schedule events of a schedule associated with a user from at least one of a mobile device associated with the user and a server configured to store the schedule associated with the user; and*

*generating the predicted departure time based on the one or more schedule events.*

*39. The method of claim 34, wherein receiving one or more charging constraints further comprises receiving the predicted departure time, wherein receiving a predicted departure time involves determining whether to (i) charge or discharge the battery of the battery powered device if the user selects the first charging program or (ii) charge the battery of the battery powered device if the user selects the second charging program, so that a charge level of the battery of the battery powered device is at the predetermined charge level at the predicted departure time.*

*40. The method of claim 34, wherein performing the control process comprises performing an optimization to determine whether to (i) charge or discharge the battery of the battery powered device at one or more time steps of an optimization window if the user selects the first charging program or (ii) charge the battery of the battery powered device at the one or more time steps of the optimization window if the user selects the second charging program.*

* * * * *